US012031397B2

(12) United States Patent
Arabskyy et al.

(10) Patent No.: US 12,031,397 B2
(45) Date of Patent: Jul. 9, 2024

(54) DEVICE AND METHOD FOR ACTUATING DOWNHOLE TOOL

(71) Applicant: INTERRA ENERGY SERVICES LTD., Calgary (CA)

(72) Inventors: Serhiy Arabskyy, Beaumont (CA); Andrew Barabash, Edmonton (CA)

(73) Assignee: INTERRA ENERGY SERVICES LTD., Calgary (CA)

( * ) Notice: Subject to any disclaimer, the term of this patent is extended or adjusted under 35 U.S.C. 154(b) by 564 days.

(21) Appl. No.: 17/165,494

(22) Filed: Feb. 2, 2021

(65) Prior Publication Data

US 2021/0156211 A1   May 27, 2021

Related U.S. Application Data

(63) Continuation-in-part of application No. PCT/CA2019/051054, filed on Aug. 1, 2019.

(30) Foreign Application Priority Data

Aug. 3, 2018 (CA) ................................ CA 3013446

(51) Int. Cl.
 *E21B 23/04* (2006.01)
 *E21B 47/00* (2012.01)
 *E21B 34/14* (2006.01)

(52) U.S. Cl.
 CPC .......... *E21B 23/0413* (2020.05); *E21B 47/00* (2013.01); *E21B 34/142* (2020.05)

(58) Field of Classification Search
 CPC .... E21B 34/14; E21B 34/142; E21B 2200/06; E21B 23/08; E21B 47/09
 See application file for complete search history.

(56) References Cited

U.S. PATENT DOCUMENTS 3,263,752 A   8/1966 Conrad
5,803,186 A   9/1998 Berger et al.
(Continued)

FOREIGN PATENT DOCUMENTS

CA   2840344 A1   9/2012
CA   2794331 C    1/2014
(Continued)

OTHER PUBLICATIONS

International Search Report issued by the Canadian Intellectual Property Office dated Oct. 10, 2019 in connection with International Patent Application No. PCT/CA2019/051054, 3 pages.
(Continued)

*Primary Examiner* — Kipp C Wallace

(57) ABSTRACT

A device for actuating a downhole tool includes a housing having a surface structure on an external surface thereof. The surface structure has an inactive state and an activated state. In the inactive state, the device can travel through seat structures mounted in a well tubing and will experience a physical impact having an impact level exceeding a threshold level when passing through each one of the seat structures. In the activated state, the device can seat in a selected seat in the well tubing. A sensor is enclosed in the housing and configured to generate a signal in response to the physical impact. A controller in the housing communicates with the impact sensor and monitors the physical impacts; and activates the surface structure based on the monitored physical impacts.

29 Claims, 23 Drawing Sheets

(56) References Cited

U.S. PATENT DOCUMENTS

| | | |
|---|---|---|
| 6,662,877 B2 | 12/2003 | Patel |
| 8,360,141 B2 | 1/2013 | Smith |
| 8,479,823 B2 | 7/2013 | Mireles |
| 8,505,632 B2 | 8/2013 | Guerrero et al. |
| 8,616,288 B1* | 12/2013 | Byrne ................ E21B 47/09 166/250.15 |
| 8,783,365 B2 | 7/2014 | McCoy et al. |
| 9,004,179 B2 | 4/2015 | Chauffe |
| 9,194,197 B2 | 11/2015 | Smith et al. |
| 9,238,953 B2 | 1/2016 | Fleming et al. |
| 9,279,302 B2 | 3/2016 | Mireles |
| 9,366,134 B2 | 6/2016 | Walton et al. |
| 9,410,401 B2 | 8/2016 | Cox et al. |
| 9,587,464 B2 | 3/2017 | Jani |
| 9,631,468 B2 | 4/2017 | Miller |
| 9,650,851 B2 | 5/2017 | Whitsitt et al. |
| 9,683,419 B2 | 6/2017 | Coon |
| 9,909,384 B2 | 3/2018 | Chauffe et al. |
| 2005/0269106 A1 | 12/2005 | Wilson et al. |
| 2010/0212891 A1 | 8/2010 | Stewart et al. |
| 2010/0294515 A1 | 11/2010 | Xu |
| 2011/0240301 A1 | 10/2011 | Robison et al. |
| 2011/0308784 A1 | 12/2011 | Ollerenshaw et al. |
| 2012/0285743 A1 | 11/2012 | Gosselin |
| 2013/0112435 A1* | 5/2013 | Fleming ............... E21B 34/14 166/318 |
| 2013/0206402 A1* | 8/2013 | Coon .................. E21B 34/14 166/305.1 |
| 2013/0248201 A1 | 9/2013 | Jackson |
| 2014/0000877 A1 | 1/2014 | Robertson et al. |
| 2014/0076542 A1* | 3/2014 | Whitsitt ............... E21B 47/092 166/250.1 |
| 2014/0090837 A1* | 4/2014 | Hedtke ................ F04B 51/00 166/68 |
| 2014/0158350 A1 | 6/2014 | Castillo et al. |
| 2014/0239956 A1 | 8/2014 | Hoversten et al. |
| 2014/0266772 A1 | 9/2014 | Walton et al. |
| 2015/0021021 A1 | 1/2015 | Merron et al. |
| 2015/0027723 A1 | 1/2015 | Fripp et al. |
| 2015/0114664 A1 | 4/2015 | Hulsewe et al. |
| 2015/0167427 A1 | 6/2015 | Simpson et al. |
| 2015/0218904 A1* | 8/2015 | Chauffe ............... E21B 33/12 166/54.5 |
| 2015/0285034 A1 | 10/2015 | Frisby |
| 2015/0361747 A1* | 12/2015 | Lafferty ............... E21B 23/08 166/373 |
| 2016/0084075 A1* | 3/2016 | Ingraham ............. E21B 23/01 166/53 |
| 2016/0108722 A1* | 4/2016 | Whitsitt ............... E21B 34/14 166/254.1 |
| 2016/0258260 A1 | 9/2016 | Walton et al. |
| 2016/0273349 A1* | 9/2016 | Echols, III ............ E21B 47/14 |
| 2016/0312581 A1 | 10/2016 | Nordheimer |
| 2016/0333666 A1 | 11/2016 | McGlothen |
| 2017/0096876 A1* | 4/2017 | Flores Perez .......... E21B 37/00 |
| 2017/0122068 A1 | 5/2017 | Graf et al. |
| 2017/0175488 A1 | 6/2017 | Lisowski et al. |
| 2017/0254165 A1 | 9/2017 | Coon |
| 2017/0314372 A1 | 11/2017 | Tolman et al. |
| 2017/0350237 A1 | 12/2017 | Giem et al. |
| 2017/0370189 A1 | 12/2017 | MacDougall et al. |
| 2018/0058179 A1 | 3/2018 | Nuryaningsih et al. |

FOREIGN PATENT DOCUMENTS

| | | |
|---|---|---|
| CA | 2887636 A1 | 4/2014 |
| CA | 2804224 A1 | 7/2014 |
| CA | 2939085 A1 | 10/2015 |
| CA | 2940852 A1 | 10/2015 |
| CA | 2904470 A1 | 11/2015 |
| CA | 2951538 A1 | 2/2016 |
| CA | 2915601 A1 | 6/2017 |
| CA | 2941571 A1 | 6/2017 |
| CN | 205840768 U | 12/2016 |
| CN | 106837200 A | 6/2017 |
| EP | 0910725 A1 | 4/1999 |
| EP | 1355166 A2 | 10/2003 |
| GB | 961901 A | 6/1964 |
| WO | 2012/045165 A1 | 4/2012 |
| WO | 2012/118889 A2 | 9/2012 |
| WO | 2013/170372 A1 | 11/2013 |
| WO | 2013/192067 A1 | 12/2013 |
| WO | 2015/149169 A1 | 10/2015 |
| WO | 2016/018429 A1 | 2/2016 |
| WO | 2016/019471 A1 | 2/2016 |
| WO | 2016/074078 A1 | 5/2016 |
| WO | 2017/062118 A1 | 4/2017 |

OTHER PUBLICATIONS

Written Opinion of the International Searching Authority issued by the Canadian Intellectual Property Office dated Oct. 10, 2019 in connection with International Patent Application No. PCT/CA2019/051054, 4 pages.

Extended European Search Report issued by the European Patent Office dated Feb. 28, 2022 in connection with European Patent Application No. 19844525.6, 8 pages.

* cited by examiner

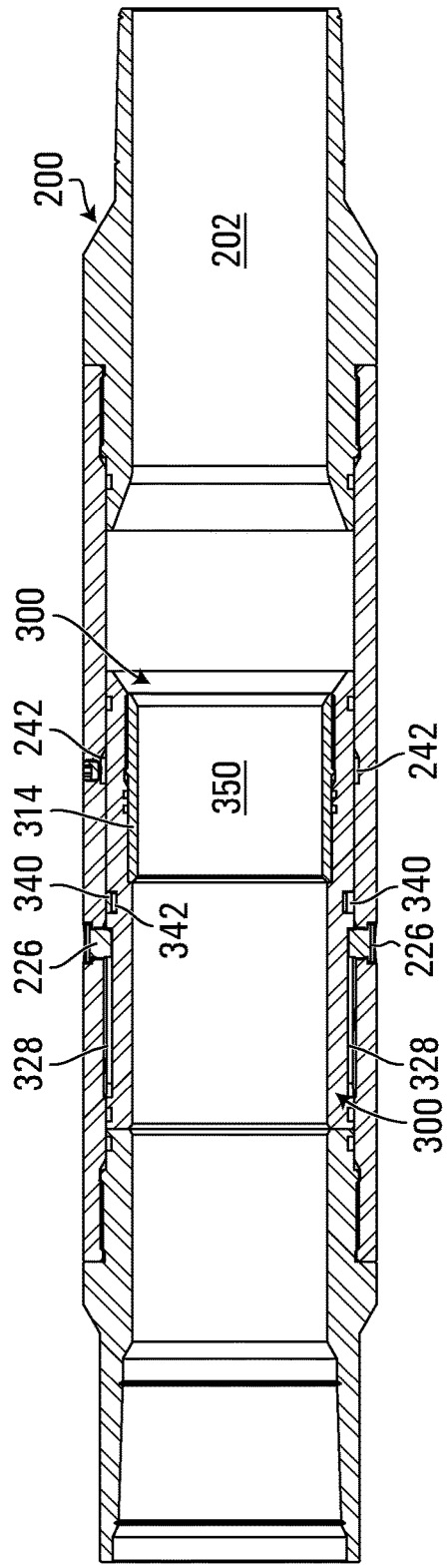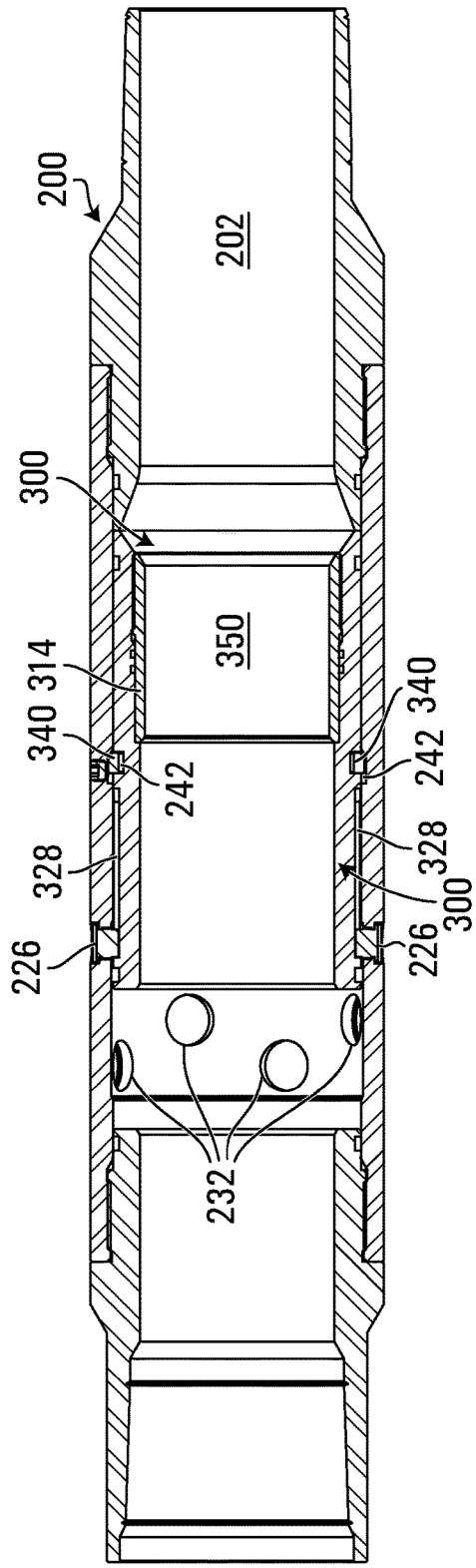

DEVICE AND METHOD FOR ACTUATING DOWNHOLE TOOL

CROSS-REFERENCE TO RELATED APPLICATIONS

This application is a continuation-in-part application of PCT International Application No. PCT/CA2019/051054, filed Aug. 1, 2019, entitled "Device and Method for Actuating Downhole Tool", which claims the benefit of, and priority from, Canadian Patent Application No. 3,013,446, filed Aug. 3, 2018, the entire contents of each of which are incorporated herein by reference.

FIELD

The present disclosure relates generally to downhole tool operations and, more particularly, to actuation devices and methods for selectively actuating downhole tools in different sections of a wellbore.

BACKGROUND

To produce hydrocarbons from subterranean hydrocarbon reservoirs such as bitumen formations, one or more wells may be drilled into the formation, and a treatment fluid may be injected into the formation through a well to facilitate or enhance hydrocarbon production. For example, a fracturing fluid may be selectively injected through different sections of a wellbore to treat corresponding zones in the formation. In a typical fracturing operation, a perforated tubing is introduced into the wellbore and the treatment fluid is pumped into the tubing and applied to the surrounding formation via the perforations, to open or enlarge drainage channels in the formation.

It is sometimes desirable to perform staged treatment of the wellbores and the surrounding formations in multiple isolated zones or sections along the tubing. For this purpose, sliding sleeves may be provided on the tubing to selectively open and close the respective sections of perforations and the sliding sleeves may be actuated with a ball or a dart.

For example, a proposed actuation dart for actuating a target tool in a tubing string includes a body conveyable through the tubing string to reach a target sleeve, a control module configured to respond to contact with a sleeve in the tubing string to locate the target sleeve, and an actuation mechanism for actuating the target sleeve when it is located. The control module includes a switch that is depressed by a seat of the sleeve as the dart passes the seat. In response to being depressed, the switch generates an output signal to allow the dart to register and count passing of the seat.

SUMMARY

In accordance with an aspect of the present disclosure, there is provided a device comprising: a housing configured to travel within a well tubing, wherein a plurality of seat structures are mounted in the well tubing, each one of the seat structures comprising a seat to seat the device thereon; a surface structure on an external surface of the housing, having an inactive state and an activated state, and being configured to (i) allow the device to travel through the seat structures when the surface structure is in the inactive state or (ii) to seat in a selected one of the seats in the well tubing when the surface structure is in the activated state, wherein the device is configured to experience a physical impact having an impact level exceeding a threshold level when passing through each one of the plurality of seat structures; a sensor enclosed in the housing, configured to generate a signal in response to the physical impact experienced by the device; a controller housed in the housing and in communication with the sensor to receive the signal from the sensor, wherein the controller is configured to determine, based on signals received from the sensor, a number of physical impacts experienced by the device with impact levels exceeding the threshold level, and to activate the surface structure when the number of physical impacts reaches a pre-selected value.

In one embodiment, the sensor comprises a shock sensor. In another embodiment, the sensor is an accelerometer.

In another aspect of the present disclosure, there is provided a method comprising: detecting a physical impact experienced by an actuation device while the device is traveling downhole in a well tubing, wherein the actuation device is seatable in a downhole seat in the well tubing; determining a number of physical impacts experienced by the actuation device wherein each of the physical impacts has an impact level that exceeds a selected threshold level of impact; and seating the actuation device in the downhole seat if the number of physical impacts has reached a pre-selected value, or passing the actuation device through the downhole seat if the number of physical impacts is less than the pre-selected value.

In a further aspect of the present disclosure, there is provided a device comprising a housing configured to travel within a well tubing, wherein a plurality of seat structures are mounted in the well tubing, each one of the seat structures comprising a seat to seat the device thereon; a surface structure on an external surface of the housing, having an inactive state and an activated state, and being configured to (i) allow the device to travel through the seat structures when the surface structure is in the inactive state or (ii) to seat in a selected one of the seats in the well tubing when the surface structure is in the activated state, wherein the device is configured to experience a physical impact having an impact level exceeding a threshold level when passing through each one of the plurality of seat structures; a sensor enclosed in the housing, configured to generate a signal in response to the physical impact experienced by the device; and a controller housed in the housing and in communication with the sensor to receive the signal from the sensor, wherein the controller is configured to: monitor, based on signals received from the sensor, physical impacts experienced by the device with impact levels exceeding the threshold level, and activate the surface structure when the monitored physical impacts indicate that the device is next reaching a target seat structure.

Other aspects, features, and embodiments of the present disclosure will become apparent to those of ordinary skill in the art upon review of the following description of specific embodiments in conjunction with the accompanying figures.

BRIEF DESCRIPTION OF DRAWINGS

In the figures, which illustrate, by way of example only, embodiments of the present disclosure.

FIG. 8 shows a cross-section view of the well tubing section of FIG. 6, where the sleeve is moved to the closed position;

FIG. 9 shows a cross-section view of the well tubing section of FIG. 6, where the sleeve is moved to the open position;

DETAILED DESCRIPTION

In an embodiment, disclosed here is a device, such as an actuation dart, for selectively actuating a selected one of downhole tools in a well tubing. For example, each of the downhole tools may have corresponding seat structures for seating the actuation device therein so that the seated device can be used to actuate the downhole tool. The actuation device is configured to locate and seat in the target seat structure in the well tubing based on the number of physical impacts the device experiences when traversing the well tubing, where each of the physical impacts exceeds a threshold impact level, such as a shock level or gravitational force ('g-force') level. A sensor is provided within the housing of the actuation device to detect such physical impacts.

Figure 1A:
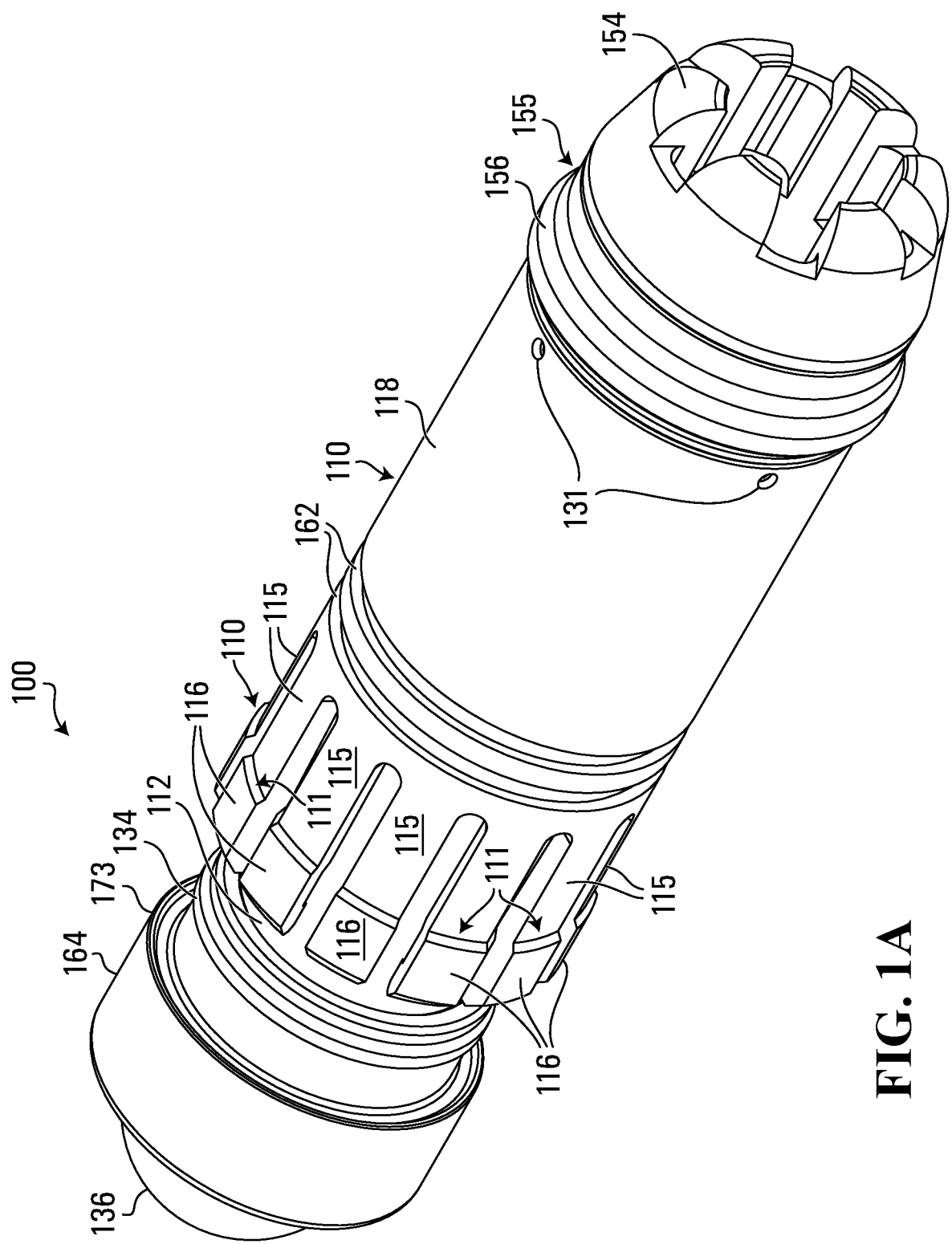
FIG. 1A is a schematic perspective view of an example actuation device according to an embodiment of the disclosure, shown in an inactive state.
Figure 1C:
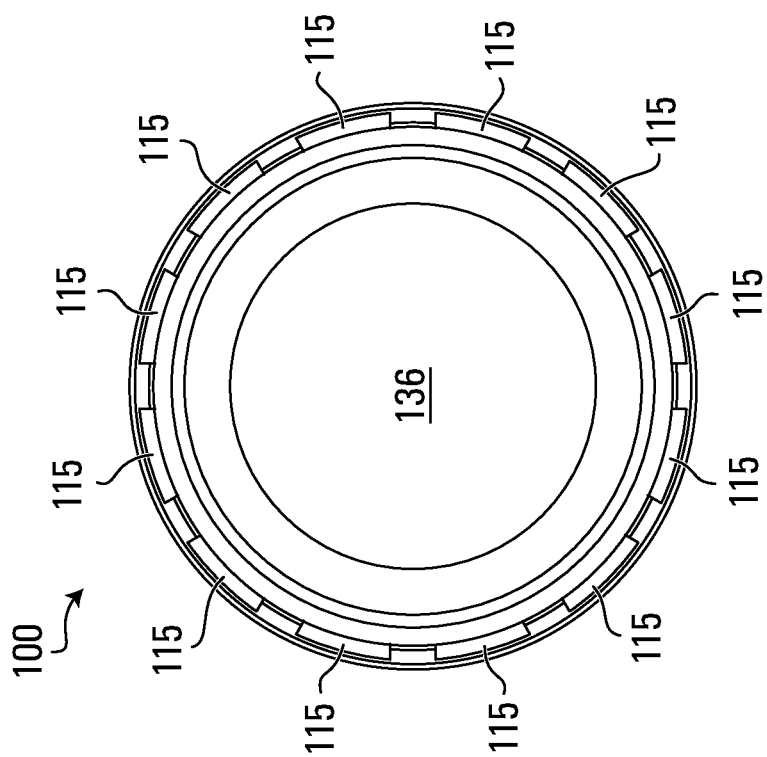
FIG. 1C is a schematic rear side view of the device of FIG. 1A.
Figure 1B:
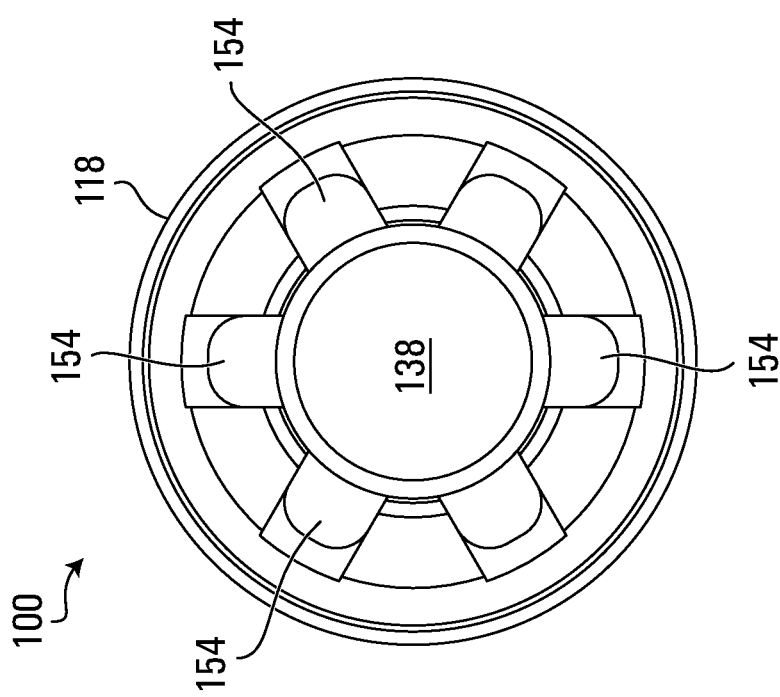
FIG. 1B is a schematic front side view of the device of FIG. 1A.
Figure 1D:
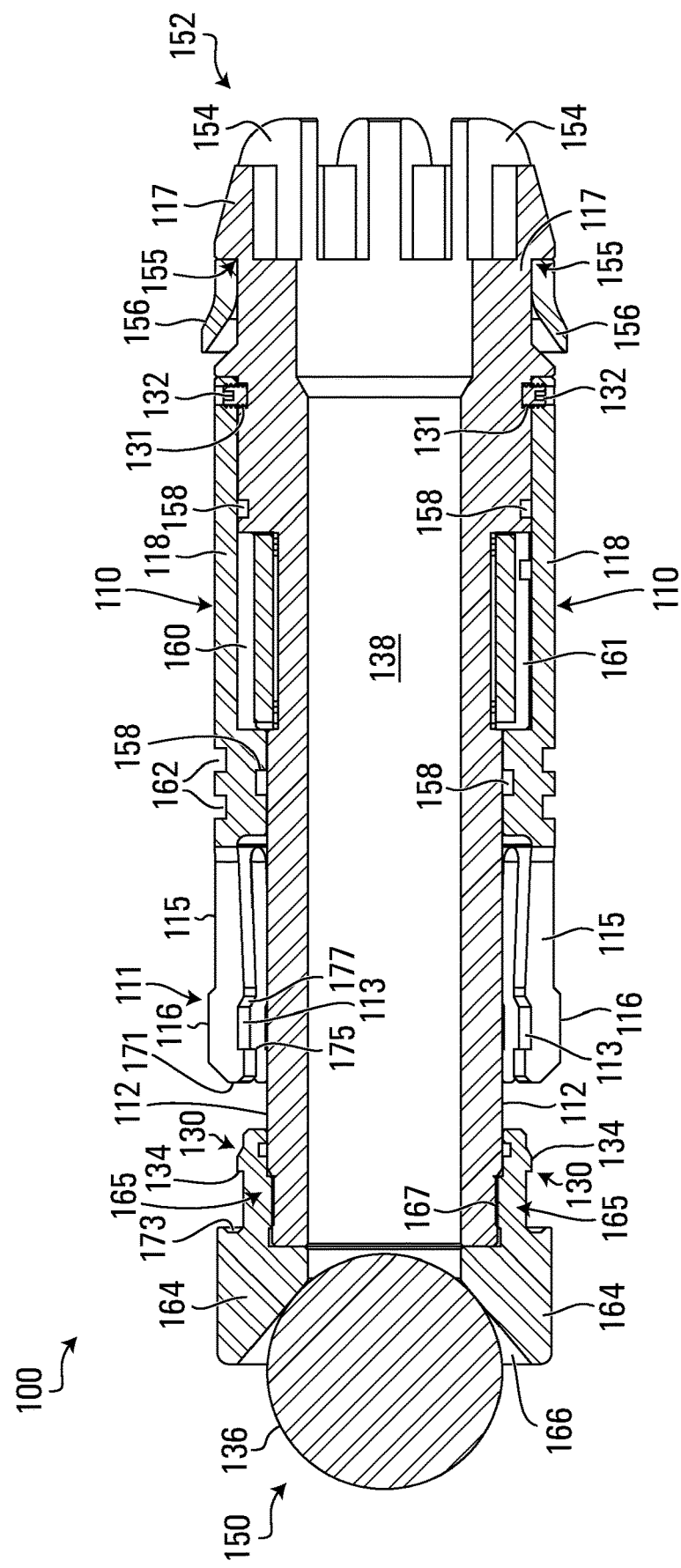
FIG. 1D is a schematic cross-section view of the device of FIG. 1A.
Figure 1E:
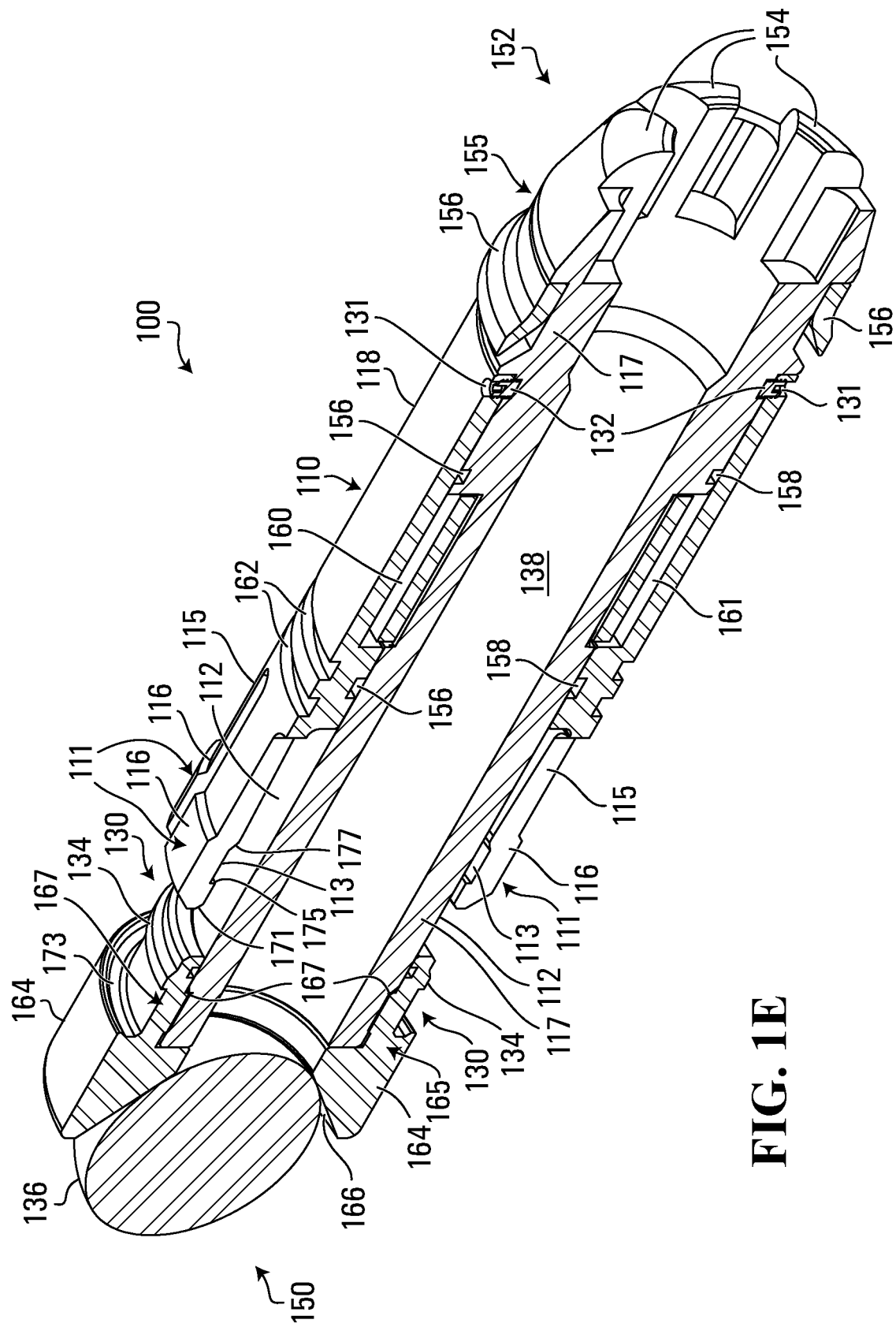
FIG. 1E is a schematic perspective cross-section view of the device of FIG. 1A.
Figure 2A:
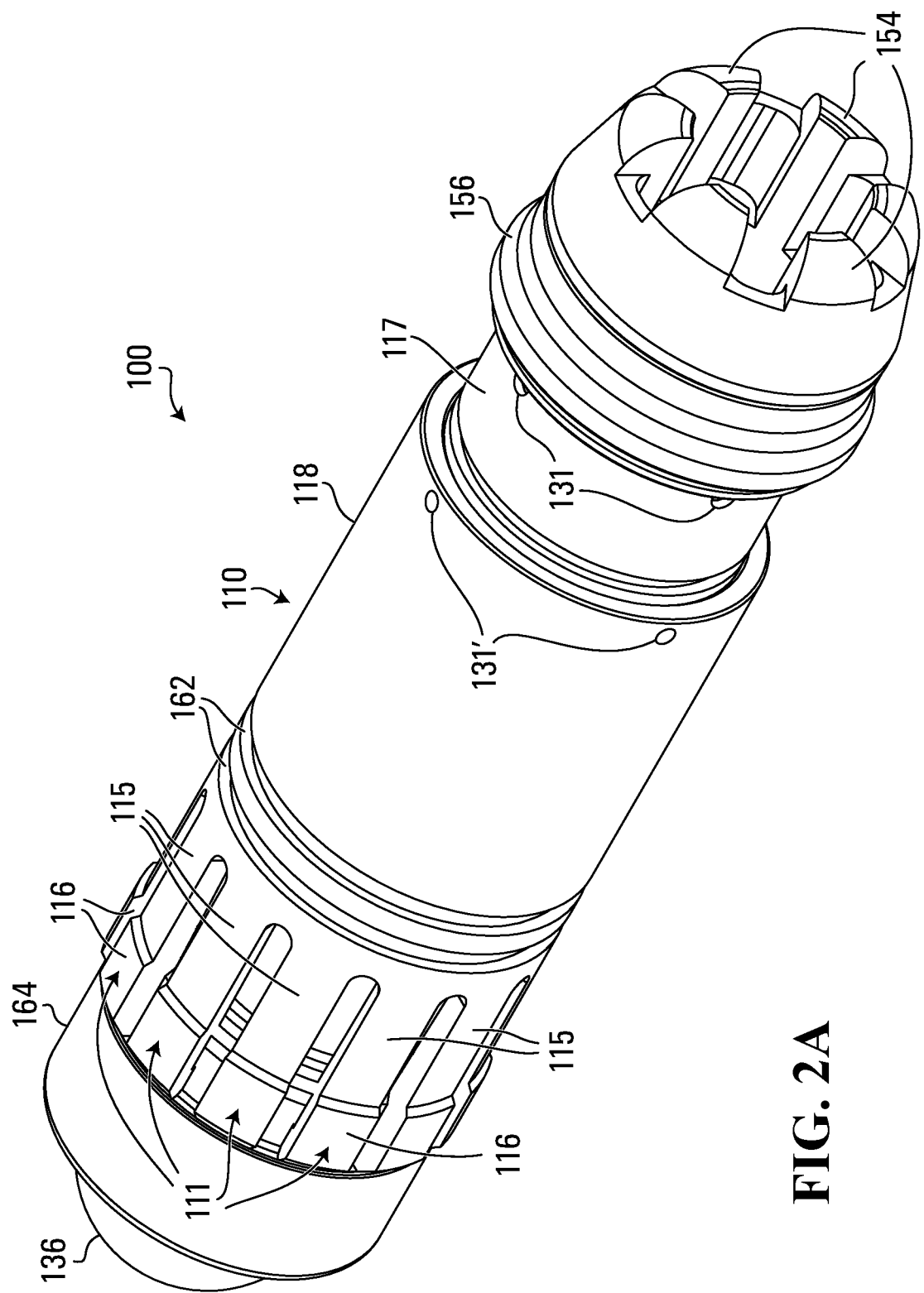
FIG. 2A is a schematic cross-section perspective view of the device of FIG. 1, in an activated state.
Figure 2B:
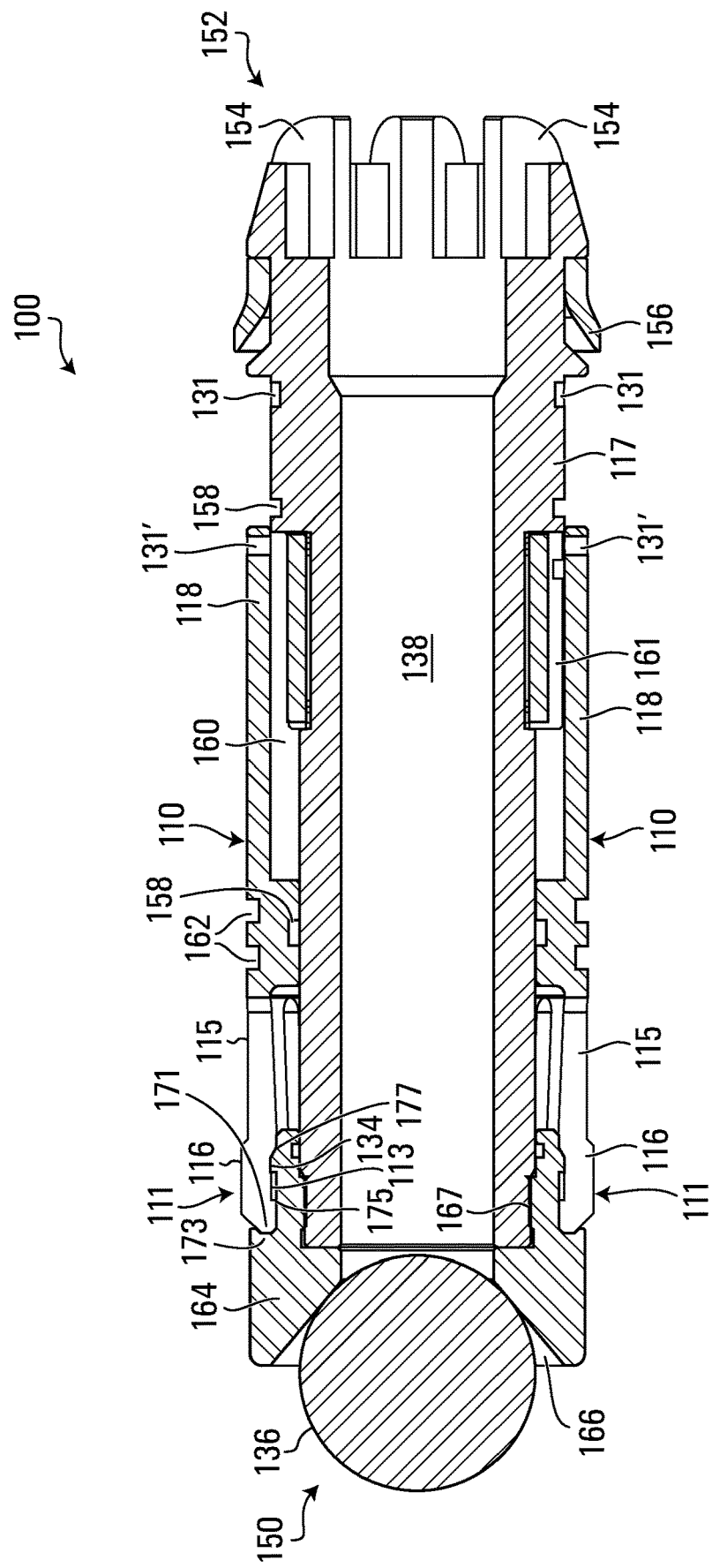
FIG. 2B is a schematic cross-section view of the device of FIG. 2A.
Figure 2C:
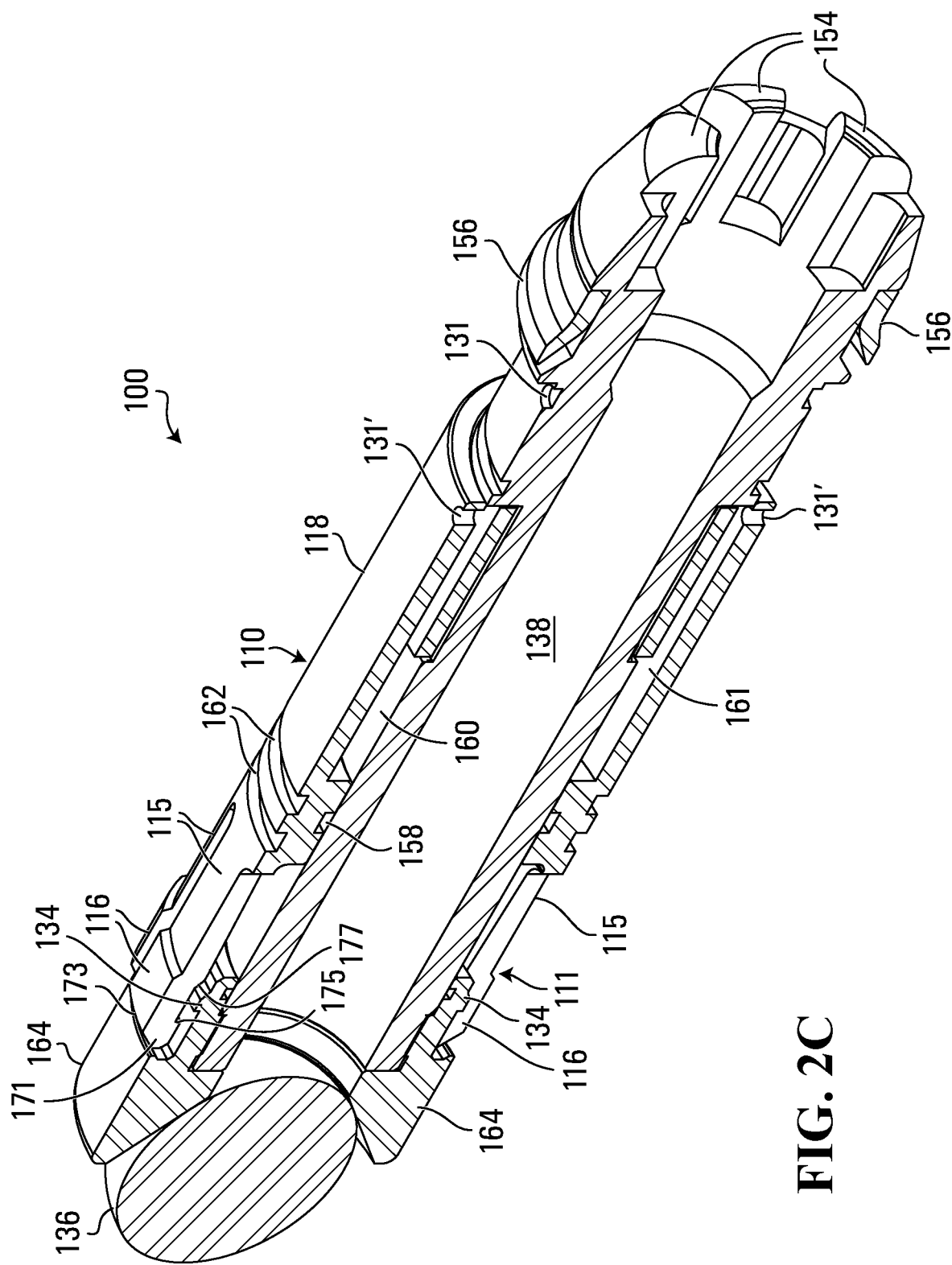
FIG. 2C is a schematic perspective cross-section view of the device of FIG. 2A.

FIGS. 1A to 1E and FIGS. 2A to 2C show schematically an actuation dart 100, according to an example embodiment of the actuation device. Dart 100 has two states, an inactive state as illustrated in FIGS. 1A-1E and an activated state as illustrated in FIGS. 2A-2C.

Dart 100 has a housing 117 defining an external surface 112 and having an uphole end 150 and a downhole end 152. Housing 117 may have an elongate, cylindrical shape.

Housing 117 may define a fluid conduit 138. Fluid conduit 138 may be a cylindrical conduit that passes through the center of housing 117. Fluid conduit 138 allows fluid to flow through housing 117 to avoid fluid pressure from building up when dart 100 is deployed.

Fluid conduit 138 may also have one or more protruding members 154 at downhole end 152. Protruding members 154 extend longitudinally past the end of fluid conduit 138, so that fluid can flow through the sides of dart 100. Thus, should the downhole end 152 of dart 100 be blocked, fluid can still flow through the sides of dart 100.

Figure 3:
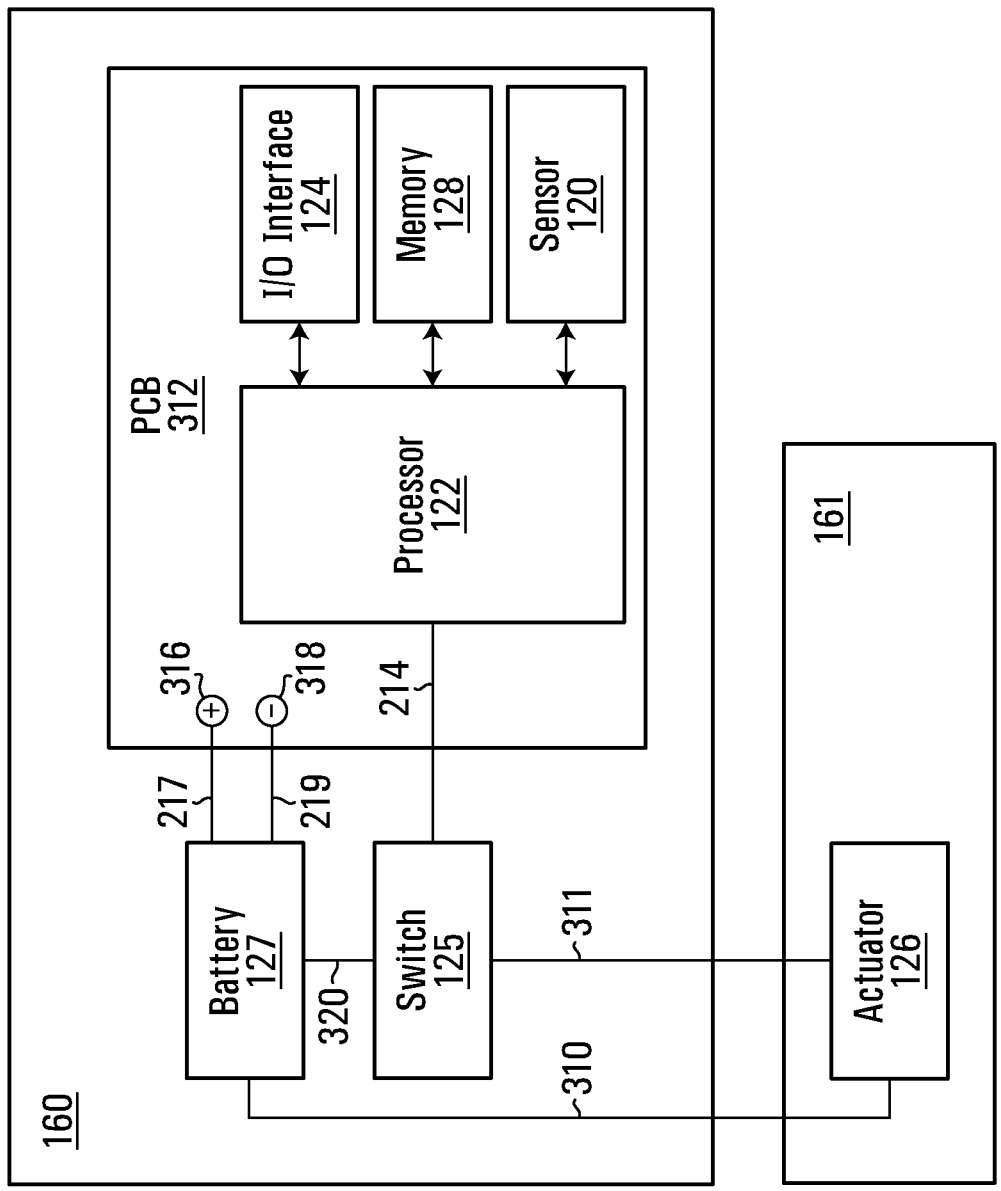
FIG. 3 is a schematic block diagram illustrating a control circuit for use in the device of FIG. 1.
Figure 4B:
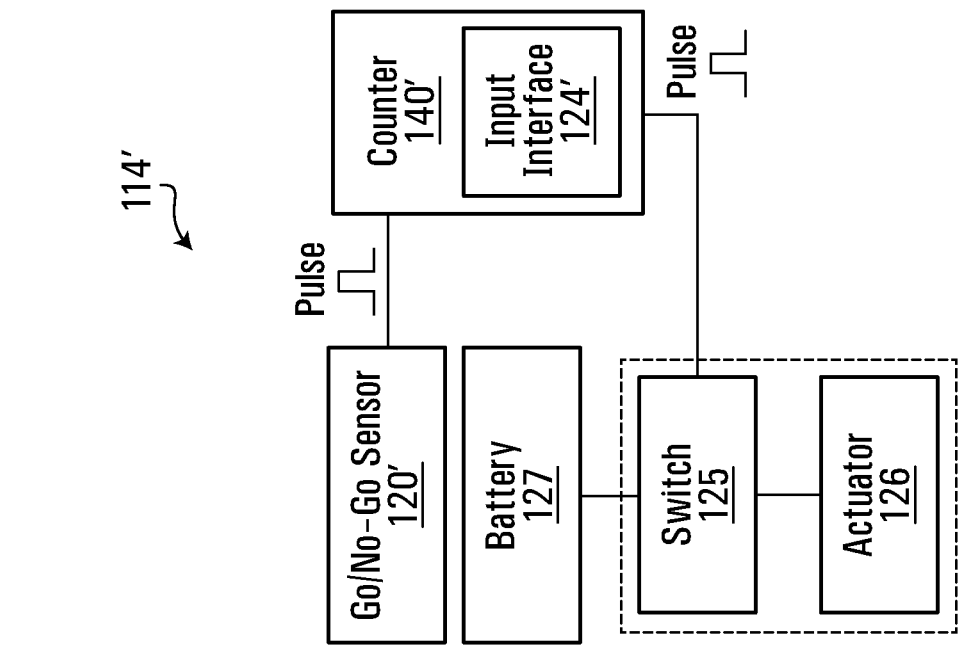
FIG. 4B is a schematic block diagram illustrating a second example control circuit for use in the device of FIG. 1.
Figure 4A:
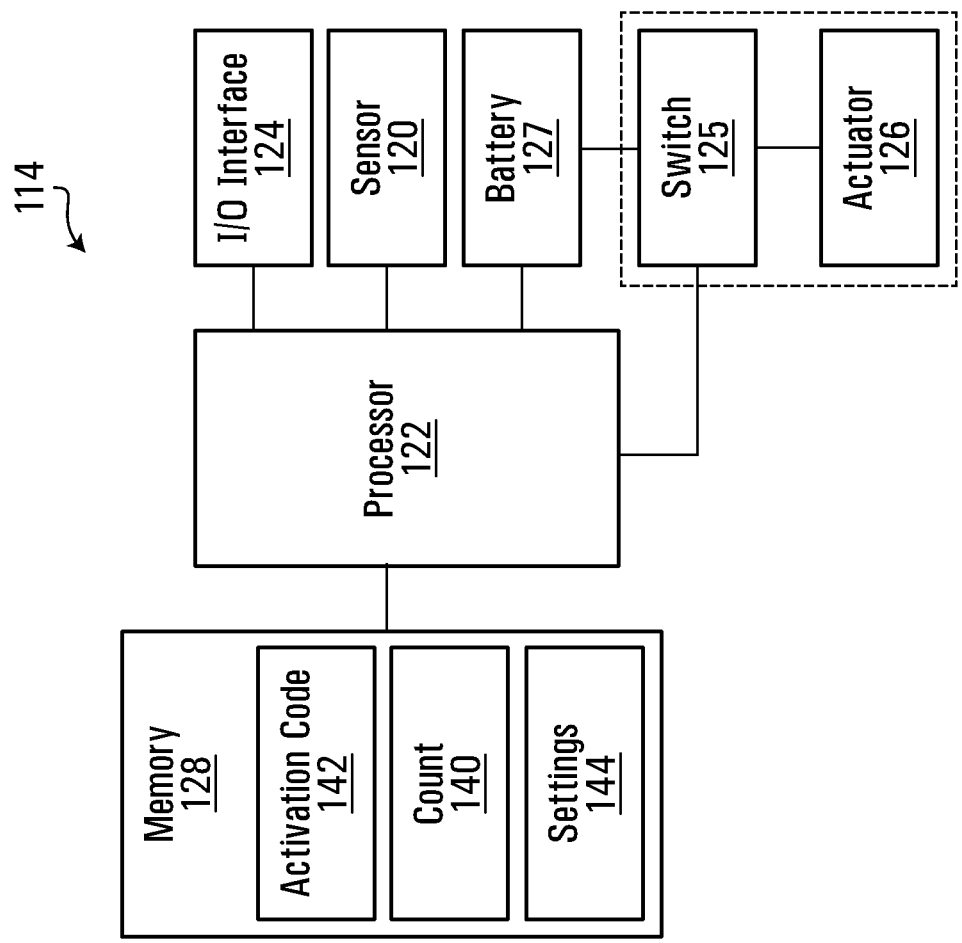
FIG. 4A is a schematic block diagram illustrating a first example control circuit for use in the device of FIG. 1.

Housing 117 may have a first cut-out 160 on a surface thereof. Cut-out 160 may house a controller such as control circuit 114 (FIGS. 3, and 4A-4B). Cut-out 160 may be filled with a waterproof and thermally insulating material to encase control circuit 114, such as a rubber, a waterproof resin, or an epoxy material. The waterproof and thermally insulating material may protect control circuit 114 from the harsh environment within the wellbore through which dart 100 is placed.

Housing 117 may also have a second cut-out 161 on a second surface thereof. Second cut-out 161 may house one or more elements of the control circuit 114. In one example, cut-out 161 houses an actuator 126 (FIGS. 3, and 4A-4B). Cut-out 161 may also be filled with a waterproof and thermally insulating material to encase those elements of control circuit 114, such as a rubber, a waterproof resin, or an epoxy material.

As illustrated schematically in FIG. 3, actuator 126 may be connected using wires 310, 311 to one or more elements of control circuit 114 housed within cut-out 160.

Housing 117 may have a number of grooves 158 for retaining seals (not shown) in between the surface 112 of housing 117 and surface structure 110. The seals may be retained due to the pressure and friction between housing 117 and surface structure 110. The seals may further protect control circuit 114 from the harsh environmental conditions which dart 100 is expected to be exposed to, including high temperature, high pressure, and corrosive fluids. The seals may be made of any number of elastomers, for example, a rubber material. Seals may be shaped in any number of shapes, for example, as O-rings or D-shaped seals.

In one example embodiment, the waterproof and thermally insulating material and the seals work together to keep control circuit 114 dry and at a suitable operating temperature, for example, less than 85° C.

Housing 117 may have a ridge 155 for retaining a foil 156. Foil 156 has a first end attached to housing 117, in proximity to downhole end 152. The first end may be glued to housing 117, or alternatively may be moulded in place. Foil 156 also has an unsecured second end, which extends outwardly from housing 117. In one example, foil 156 is angled such that the second end of foil 156 points towards uphole end 150. In one example, foil 156 is annular in shape, extending around housing 117. Foil 156 may be made of soft rubber material suitable for use with fracking fluids, such as Viton™, hydrogenated nitrile butadiene rubber (HNBR), or a nitrile rubber (NBR). In one example embodiment, foil 156 may be slightly larger in diameter than housing 117.

Dart 100 has a surface structure 110 on external surface 112 of housing 117. Surface structure 110 may include a movable structure that is moveable on the external surface, such as a sleeve 118 as depicted, which is movably mounted on the external surface 112 of housing 117 and surrounds a portion of external surface 112. One or more fingers 115 may be provided and extend longitudinally from an end of sleeve 118. Sleeve 118 may be made from the same material used to make housing 117, although a different material may be used.

Each finger 115 may have a bendable terminal tip 116 and a protrusion 111 extending therefrom to expand the diameter of dart 100. Each finger 115 has an edge 171 at an end thereof.

In an initial position (FIG. 1), fingers 115 may be cantilevered from the end of sleeve 118 to project around and above external surface 112, leaving a gap between terminal tips 116 and external surface 112. Terminal tips 116 are thus unsupported by the housing 117 in this initial position. Fingers 115 may be made of a resilient material so that the terminal tips 116 of fingers 115 can bend under pressure towards the housing when unsupported, thus allowing dart 100 to pass through restrictions in the tubing through which dart 100 travels. In this initial position dart 100 is in the inactive state so that dart 100 can pass through restrictions in the tubing.

Sleeve 118 may be slidable from the initial (first) position to a second position where the terminal tips 116 are supported by a portion of housing 117, particularly ridge 134, and thus can no longer bend towards the housing surface. Housing 117 may also include locking mechanisms to secure sleeve 118 in each position. When the sleeve 118 is in the second position, it is in the activated state as dart 100 can no longer pass through a selected seat, as will be further discussed below.

To lock the sleeve 118 in the initial position, sleeve 118 may include a bore 131' and housing 117 may include a corresponding counterbore 131 at downhole end 152 (FIGS. 2A-2C), for receiving a shear screw 132 to secure sleeve 118 to housing 117 at the initial position, corresponding to the inactive state. Shear screw 132 may be made of a frangible, breakable material to allow sleeve 118 to be released from the initial position to activate dart 100. Shear screw 132 may be made of bronze, steel, or hard plastic. Bore 131' and counterbore 131 have internal threads and are aligned for receiving and thread engagement with shear screws 132 when the sleeve 118 is in the initial position.

In some embodiments, a number of shear screws 132 may be positioned around the circumference of housing 117 to secure sleeve 118. In the embodiment as depicted in the drawings, four shear screws are used to secure sleeve 118. Each shear screw may require a head breaking torque in the range of 450 to 550 kg, such as 500 kg, to break or shear off the screw head. In different embodiments, the number and positions of bores 131' and counterbores 131 may be varied. Further, the counterbores 131 may be replaced with a groove extending along the circumference of housing 117.

With counterbores 131, when shear screws 132 are threadably engaged with bores 131' and counterbores 131, sleeve 118 is prevented from sliding axially and rotating about its central axis. If the counterbores are replaced with a groove, the sleeve 118 is still prevented from sliding axially but may be able to rotate about its axis.

In other embodiments, sleeve 118 may be secured in the first position using one or more pins (not shown) or an annular rim (not shown).

Dart 100 may also include a locking mechanism 130 for locking sleeve 118 in the second position, corresponding to the activated state. Locking mechanism 130 is positioned in proximity to uphole end 150 and includes a ridge 134 and a bevelled surface 173 that matches the shape of the edge 171 of terminal tips 116. Terminal tips 116 may have a notch 113 that matches the shape of ridge 134 and oriented to engage ridge 134. When sleeve 118 is in the second position, ridge 134 props up the terminal tips 116 by abutting notch 113 to prevent fingers 115 from bending towards the surface 112 of the dart 100, and edge 171 of the tips 116 abuts the bevelled surface 173 to prevent fingers 115 from bending away from the surface 112 (as shown in FIG. 2B), thus preventing unlocking of the terminal tips 116. Thus, in the activated state, fingers 115 are prevented from bending under pressure or on impact, and the surface structure is non-collapsible.

In addition, locking mechanism 130 also prevents fingers 115 from moving longitudinally. This is because ridge 134 blocks the side walls 175, 177 of notch 113 from moving laterally relative to the surface 112.

Housing 117 may include one or more ridge structures 162, which may be used to retain seals (not shown), which seal fluid to one side of a tubing through which dart 100 may travel.

Dart 100 may also have a removable cap 164 at either end thereof. Cap 164 may be wider in diameter than housing 117. Cap 164 may be removed to slide sleeve 118 into position surrounding external surface 112 of housing 117. Cap 164 is removably fixed at uphole end 150 using arms 165 which latch onto external surface 112. External surface 112 may have grooves 167 that correspond to the position of arms 165 to provide cap 164 with a surface to latch onto.

Cap 164 may also include a receptacle 166. Receptacle 166 has an enlarged opening, which may be cone-shaped as depicted in the drawings, to receive and retain a ball 136. In one embodiment, the opening has a wider diameter than the diameter of housing 117. Ball 136, when retained in receptacle 166, blocks fluid flow through fluid conduit 138. In some embodiments, receptacle 166 may include a retaining clip (not shown), pin (not shown), or other mechanical mechanism to retain ball 136.

Dart 100 includes a control circuit 114 for activating surface structure 110 to seat at a selected seat structure within the wellbore.

A first example embodiment of control circuit 114 is schematically shown in block diagram form in FIG. 4A. Control circuit 114 may include a processor 122 in communication with an impact sensor 120, actuator 126, I/O interface 124, and memory 128.

Memory 128 is a processor-readable medium and stores processor executable instructions, including activation code 142 for activating dart 100. When executed, activation code 142 may cause processor 122 to implement a method 400, as discussed in detail below.

Memory 128 also stores variables for use by activation code 142, including a count 140 indicating the number of impacts experienced by dart 100 within the wellbore that exceeds a threshold level, and settings 144 defining operational parameters of dart 100 (for example, defining a selection of seat structures for seating).

Impact sensor 120 generates a signal in response to an acceleration of dart 100 resulting from a physical impact experienced by dart 100 as dart 100 travels within the wellbore.

Impact sensor 120 may be selected from shock sensors, accelerometers, gyroscopes, strain gauge sensors, proximity sensors, piezoelectric sensors, piezo-resistive sensors, capacitive sensors, and acoustic sensors.

An acoustic sensor, such as a microphone, can detect sound or other acoustic waves generated by the physical impact of dart 100 contacting a seat structure 350. The acoustic wave generated by such impact may have identifiable characteristics, such as signature frequencies or amplitudes, which can be used by the control unit to determine if dart 100 has passed through a seat structure 350. Processor 122 may, in some embodiments, analyze the detected acoustic signal to determine whether detected acoustic signal indicates a physical impact between dart 100 and the seat structure 350. For example, the amplitude of the detected acoustic signal may be correlated to the level of physical impact experienced by dart 100.

In one example embodiment, more than one sensor (of the same type or of different types) may be used in combination.

In one example embodiment, sensor 120 may be configured to measure an impact causing dart 100 to experience a gravitational force (g-force) in the range of 400 G to 1000 G.

In one embodiment, sensor 120 may be a SignalQuest™ SQ-ASA series shock sensor, which has a sensitivity range of 100 G to 2000 G and has a response time of under 100 micro seconds. The SignalQuest™ SQ-ASA series shock sensor provides an analog voltage pulse output (in the range of 3 to 4 Volts) upon detecting a shock that exceeds a threshold level. The SignalQuest™ SQ-ASA series shock sensor is cylindrical in shape and is approximately 7 mm long and 3 mm in diameter and may be coupled to a printed circuit board ('PCB').

The SignalQuest™ SQ-ASA series shock sensor is suitable for operation at temperatures ranging from −40 to +85° C. As previously discussed, the operating temperature of the sensor may be maintained at a suitable operating temperature by isolating control circuit 114 using a waterproof and thermally insulating material.

In another embodiment, sensor 120 may be a Murata™ shock sensor.

Impact sensor 120 may be a "go/no-go" sensor which only generates and sends a signal to processor 122 when the level of impact exceeds a pre-determined threshold level of impact. A "go/no-go" sensor may be suited to detect sudden and transient impacts and changes in motion, as a "go/no-go" sensor generates an output signal (for example, in the form of a voltage or current pulse) to processor 122 only when the level of impact exceeds the selected threshold value.

Alternatively, impact sensor 120 may be an impact level sensor. An impact level sensor can generate a signal indicating a quantitative level of impact experienced by dart 100 over a period of time (i.e. a sampling period).

The output of the impact level sensor may be an analog voltage or current output that has an amplitude indicative of the level of impact detected. Processor 122 may sample the analog output of the impact level sensor. A sampling rate of the impact level sensor may be selected to ensure that a sudden and transient impact or change in motion is detected by impact level sensor. In one embodiment, the sampling rate is in the range of 15,000 to 25,000 samples per second. An additional analog-to-digital convertor (not shown) may convert the analog voltage or current output to a digital format, and provide the digital format to processor 122.

Alternatively, the output of the impact level sensor may be a digital output that represents the level of impact detected in a digital format (e.g. using a binary code). The impact level sensor may update the digital output at a predefined number of times per second, which may range from 15,000 to 25,000 times per second.

However, due to the sampling required to detect sudden and transient impacts or changes in motion, an impact level sensor may consume more power compared to a "go/no-go" sensor. Further, a more powerful or more complicated processing circuit or processor may be required to process the signals from an impact level sensor compared to a "go/no-go" sensor, as more signals need to be processed and more processing steps may be required.

Processor 122 is configured to receive signals from sensor 120 and updates, based on the signals received from sensor 120, the count 140 in memory 128. Accordingly, the count 140 in memory 128 is indicative of physical impacts experienced by dart 100 with impact levels exceeding a pre-determined threshold level.

The pre-determined threshold level of a "go/no-go" sensor is determined by selection of a "go/no-go" sensor that is triggered only when the impact level detected exceeds the threshold level. Thus, processor 122 is configured to increment count 140 in response to any signal from a "go/no-go" sensor.

On the other hand, the pre-determined threshold level of an impact level sensor may be stored in settings 144. Processor 122 increments count 140 when a signal from an impact level sensor indicates that a physical impact experienced by dart 100 has an impact level that exceeds the pre-determined threshold level, as stored in settings 144.

Settings 144 may be configured via I/O interface 124, which provides a communication link between control circuit 114 and external devices. I/O interface 124 may be a wireless communication interface, thereby ensuring that control circuit 114 remains in a sealed enclosure. Alternatively, I/O interface 124 may be a wired interface, and may optionally have a communication port protected using a removable seal (not shown).

Processor 122 may provide an activation signal to activate actuator 126 when count 140 reaches the pre-selected value, as stored in settings 144. Actuator 126 may be electrically coupled to battery 127, via a switch 125 that operates under control of processor 122. Switch 125 may receive an activation signal from processor 122. In response to receiving the activation signal, switch 125 may connect battery 127 to actuator 126, thereby causing actuator 126 to activate dart 100. The activation signal may be an analog voltage or current pulse that causes switch 125 to open, thereby allowing current to flow from battery 127 to actuator 126. Alternatively, switch 125 may be controlled using a digital signal from processor 122.

To activate dart 100, actuator 126 may provide a force sufficient to release sleeve 118 from shear screw 132, thereby causing sleeve 118 to slide towards uphole end 150, engage locking mechanism 130, and lock in the activated position. As previously explained, once locked in the activated position, sleeve 118 is prevented from collapsing.

In one example embodiment, actuator 126 may include a micro gas generator. The force to release sleeve 118 from sear screws 132 may be provided by the micro gas generator, thereby causing sleeve 118 to slide towards uphole end 150. The micro gas generator may be selected from any number of commercially available micro gas generators. As is known to a person skilled in the art, the micro gas generator may include an initiator charge and a gas generating composition. The initiator charge ignites the gas generating composition upon receiving an electric charge. Battery 127 may provide the electric charge to ignite the initiator when switch 125 is opened in response to the activation signal. The size and response time (which is typically in the range of 2 to 4 milliseconds) of the micro gas generator may be selected so that the micro gas generator is suitable for use in dart 100.

In another example embodiment, the actuation force to release sleeve 118 from shear screws 132 may be provided by an electric actuator, such as a motor, which may be powered using a power source, such as a battery.

In another embodiment, the actuation pressure for actuating sleeve 118 may be provided by, or result from, a chemical reaction with or without combustion, or generation of gases. For example, two or more chemicals may be mixed to generate a gas. In yet another embodiment, the force to release sleeve 118 may be provided using hydraulic pressure, for example, by allowing fluids to flow into a cavity of dart 100.

Control circuit 114 may also include a power source, such as a battery 127, to power the modules of control circuit 114.

As illustrated schematically in FIG. 3, sensor 120, I/O interface 124, processor 122, and memory 128 may be mounted to a PCB 312 and thereby connected to one another. PCB 312, switch 125, and battery 127 (or other suitable power source) may be physically secured in cut-out 160 on dart 100. Actuator 126 may be physically secured in cut-out 161 on dart 100. Alternatively, actuator 126 may also be physically secured in cut-out 160.

PCB 312 may include negative and positive terminals 318, 316 for connecting the PCB to battery 127. The terminals of the battery 127 may be connected to wires 317, 319 which are then connected to the terminals 318, 316 of the PCB. The PCB may route power from battery 127 to the modules mounted thereon.

The battery 127 may also be connected, using a wire 310 to actuator 126, and using a wire 320 to switch 125. Switch 125 may also be connected to actuator 126 using a wire 311. Processor 122 may also be connected using switch 125 to a wire 214 to send the activation signal.

Control circuit 114', shown schematically in block diagram form in FIG. 4B, provides a second example embodiment of control circuit 114. Control circuit 114' may thus replace control circuit 114. Control circuit 114' includes "go/no-go" sensor 120', a counter 140', a power source, such as battery 127, and an actuator 126. Actuator 126 is electrically coupled to battery 127 via a switch 125.

"Go/no-go" sensor 120' is powered by battery 127 and generates an analog voltage or current pulse output when a physical impact experienced by dart 100 exceeds a threshold level. Counter 140' may be a mechanical or electronic counter that is configured to increment its count upon receiving the pulse output from "go/no-go" sensor 120'. Accordingly, counter 140' increments its count when the physical impact experienced by dart 100 exceeds the threshold level of "go/no-go" sensor 120'. Counter 140' is also configured to provide an output indicative of its count, which may be an electronic signal or a physical change (for example, counter 140' may cause a mechanical dial to rotate). In the case where counter 140' is an electronic counter, it may also be powered by battery 127.

Counter 140' may include an input interface 124' to allow counter 140' to receive a pre-selected value and counter 140' may actuate actuator 126 when the count reaches the pre-selected value. Input interface 124' may be an electronic interface or a mechanical interface, such as a push-pin interface or a mechanical dial.

As illustrated in FIG. 4B, when the count is equal to the value selected using the input interface 124', counter 140' triggers actuator 126 by generating an analog voltage or current pulse that causes switch 125 to open, thereby allowing current to flow from battery 127 to actuator 126. In an alternative embodiment, when the count is equal to the value selected using the input interface 124', counter 140' may generate a physical change that causes switch 125 to open instead of generating the pulse.

Figure 5:
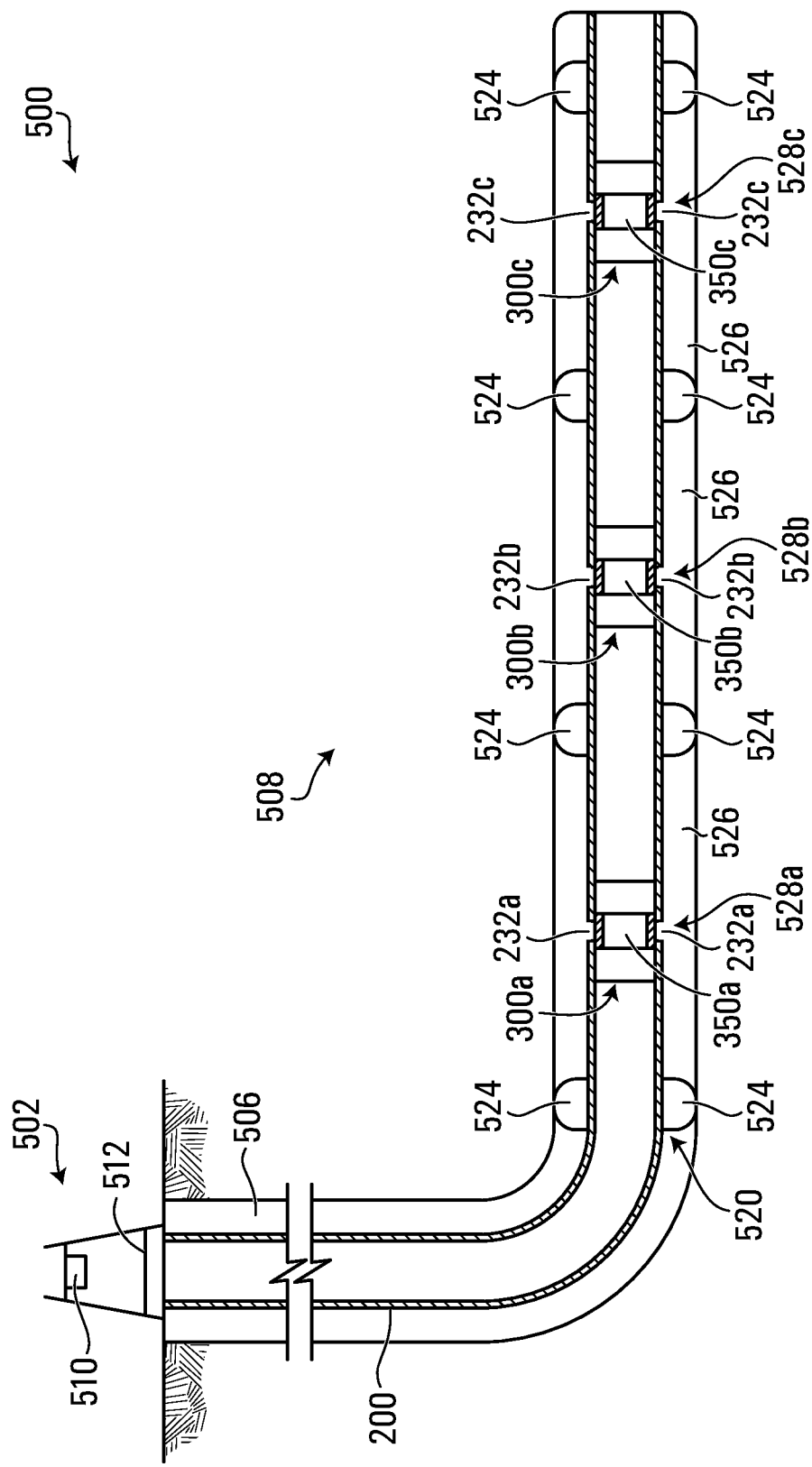
FIG. 5 shows a schematic cross-section view of an example well system.

FIG. 5 shows a schematic view of a well system 500 from a side elevation view. Well system 500 may include a wellbore 506 extending therefrom and penetrating a subterranean earth formation 508. Well system 500 may also include an oil and gas rig 502 at the Earth's surface. Rig 502 may include derrick 510 and rig floor 512.

A completion assembly 520 may be deployed within a lateral portion of wellbore 506. Completion assembly 520 includes a well tubing 200 supported by packers 524 or other wellbore isolation devices. Fracking fluid can be pumped downhole through tubing 200 at a controlled pump/flow rate.

Packers 524 may seal off an annulus 526 defined between completion assembly 520 and an inner wall of wellbore 506. Thus, subterranean formation 508 may be effectively divided into multiple regions 528 (shown as regions 528a, 528b, and 528c) which may be stimulated and produced independently. While only three regions 528a-c are shown in FIG. 5, any number of regions 528 may be defined or otherwise used in the well system 500.

Each region 528 may include one or more sliding sleeves 300 (shown as sliding sleeves 300a, 300b, and 300c) arranged in, coupled to, or otherwise forming integral parts of tubing 200. Each sliding sleeve 300a-c is movable within tubing 200 to open one or more ports 232 (shown as ports 232a, 232b, and 232c) defined in tubing 200. Once opened, the ports 232a-c allow fluid communication between the annulus 526 and the interior of tubing 200. Pressurized fracking fluid 518 may then be released to fracture formation 508.

Each sliding sleeve 300a-c also includes a seat structure 350 (shown as seat structures 350a, 350b, and 350c). Seat structures 350a-c provide a restriction in tubing 200 for seating dart 100. The seat structures 350a, 350b, and 350c are placed along tubing 200, with each seat structure being placed at least 10 meters away from the next seat structure.

In order to move a sliding sleeve 300a-c to its open position, and thereby open the corresponding ports 232a-c, dart 100 (not shown) may be conveyed into tubing 200. Dart 100 then travels through tubing 200 until dart 100 seats at the seat structure 350a-c of the selected sliding sleeve 300a-c. Dart 100 may be pumped through tubing 200, along with fracking fluids.

Dart 100 may be conveyed into tubing 200 in the inactive state. Dart 100 activates prior to reaching the selected sliding sleeve 300a-c and after passing through the previous sliding sleeve 300a-c, to thereby seat at that selected sliding sleeve 300a-c. For example, if the selected sliding sleeve is 300c, then dart 100 is activated after passing through sliding sleeve 300b and prior to reaching sliding sleeve 300c. In another example, if the selected sliding sleeve is 300b, then dart 100 activates after passing through sliding sleeve 300a and prior to reaching sliding sleeve 300b. In yet another example, if the selected sliding sleeve is 300a (i.e. the first sliding sleeve 300), then dart 100 may be conveyed into tubing 200 in the activated state.

Once conveyed into tubing 200, dart 100 travels at a speed in the range of 2.5-12 m/s. At such a speed, the dart 100 can travel 10 meters in about 0.8 to about 4 seconds. Conveniently, the time required to activate dart 100 may be in the range of 2 to 4 milliseconds. As can be understood by those skilled in the art, 10 m is a typical distance between two adjacent downhole tools, such as seat structures 350.

The speed of dart 100 may be controlled by controlling the flow/pump rate of the fracking fluids. In one example, the flow rate is set to be in the range of 2 to 8 m$^3$ per minute.

When dart 100 travels through tubing 200 at the above-noted speeds, dart 100 is configured to experience a physical impact having an impact level exceeding the threshold level of sensor 120 when passing through each one of seat structures 350 in the inactive state. Thus, sensor 120 detects an impact each time dart 100 is impacted when contacting a seat structure 350 in the inactive state with an impact level exceeding the threshold level, and generates a signal. In response to the signal, processor 122 increments count 140 (or counter 140' increments its count). Accordingly, the count indicates the number of physical impacts experienced by dart 100 that exceeds the threshold level (which may be indicative of the seat structures 350 that dart 100 has travelled through).

As dart 100 travels through tubing 200, dart 100 may also experiences other impacts. For example, impacts with the walls of tubing 200 or other structures in tubing 200. The threshold level of physical impact for incrementing count 140 is therefore set to be substantially higher than the floor level. In one embodiment, the threshold level of shock may be 4 times greater than the floor level.

In one example embodiment, the floor level may be 200 G, the threshold level of shock may be 500 G, and surface structure 110 may be configured such that dart 100 experiences a physical impact having an impact level of 800 G when passing through seat structures 350 in tubing 200.

However, the level of physical impact experienced by dart 100 may vary based on any one of the following factors: the speed at which dart 100 is conveyed through tubing 200, the flow/pump rate of the fracking fluids, the weight of dart 100, the materials used to make fingers 115, the number of fingers 115, the thickness of fingers 115 (particularly at the point of attachment to sleeve 118), the shape of terminal tips 116, the angle and shape of seat structures 350, amongst others. Accordingly, in different embodiments, the threshold level of shock may be set in dependence on more than one factor.

In one example embodiment, sensor 120 may be configured to detect the force of impact on dart 100 in only one direction, and particularly, along the longitudinal axis of dart 100 and tubing 200 (axis 1, as shown in FIGS. 12-15). The impact of dart 100 with seat structures 350 may result in a force direction predominantly along the longitudinal axis of dart 100. Accordingly, a sensor configured to detect the force of impact in only one direction is less likely to detect other impacts, and therefore less prone to false positive signals.

Accordingly, dart 100 is configured to experience a level of impact that exceeds the threshold level upon impact with a seat structure 350 and to experience levels of impact that are significantly lower than the threshold level upon impact with other structures in tubing 200. Since count 140 is not incremented unless the impact level is greater than the threshold level of impact, such other impacts will not be counted, and can be avoided.

FIGS. 6-9 are examples of well tubing 200, sleeve 300, and seat structure 350 in more detail.

Figure 6:
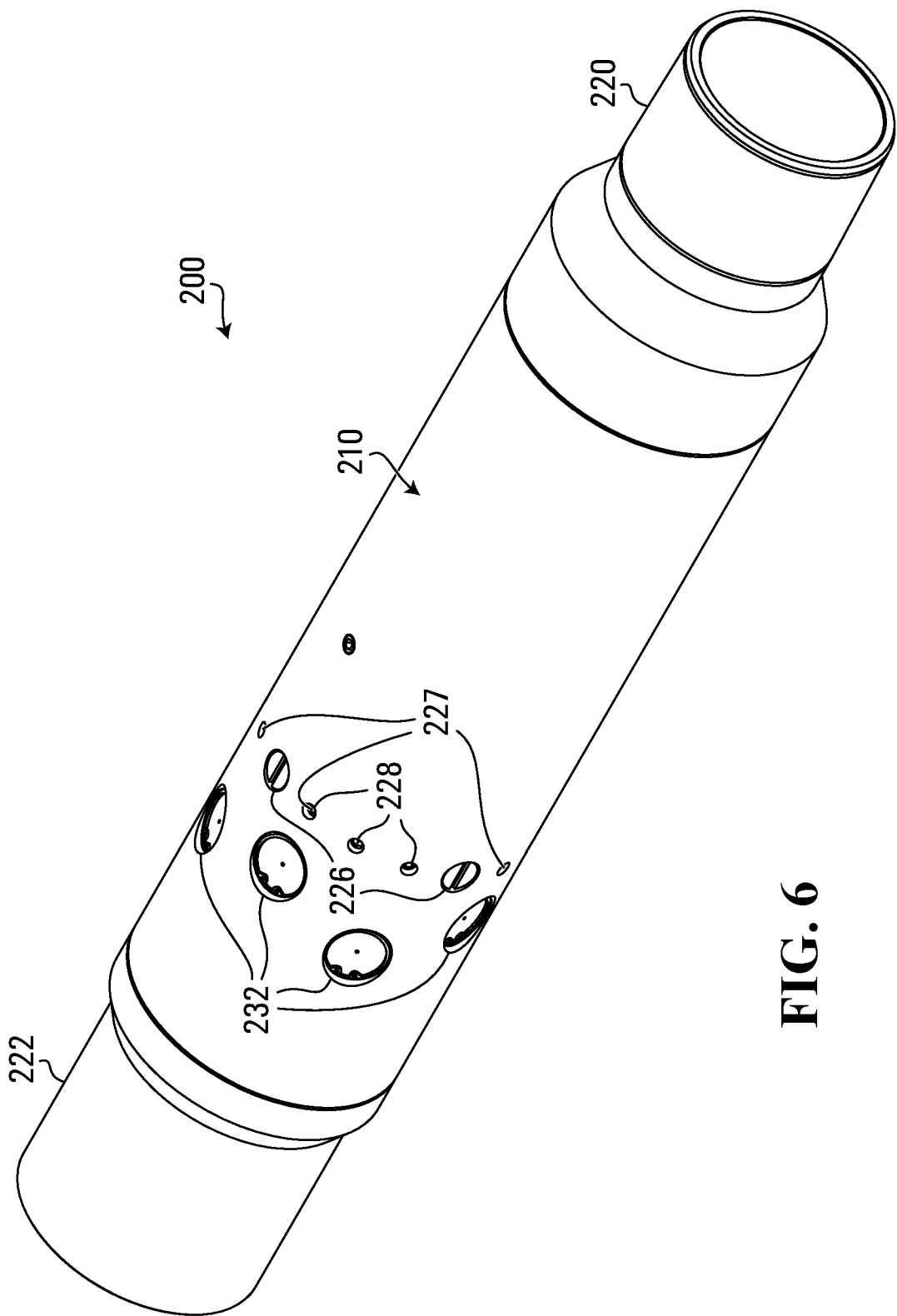
FIG. 6 is a top-perspective view of a section of the well tubing in the well system of FIG. 5.

FIG. 6 shows in isolation a section of an example well tubing 200 for use with well system 500. Each section of tubing 200 may have an outer housing 210, one or more ports 232, and upper and lower connection elements 222, 220 to connect multiple sections of tubing to form well tubing 200.

The section of well tubing 200 may also have pins 226 which extend inwardly from outer housing 210 to engage with sleeve 300. Pins 226 may be partially threaded so that the pin 226 can be secured to bore holes in tubing 200. In one example, pins 226 have an upper threaded portion and a lower unthreaded shaft.

The section of well tubing 200 may also have shear pins 228 which extend inwardly from outer housing 210 to engage with sleeve 300. Pins 228 may be partially threaded so that the pin 228 can threadly engage internal threads in pin holes 227. In one example, pins 228 have an upper threaded portion and a lower unthreaded shaft.

As can be seen in FIGS. 8 and 9, tubing 200 also has an internal groove 242, the function of which will be discussed below.

Figure 7:
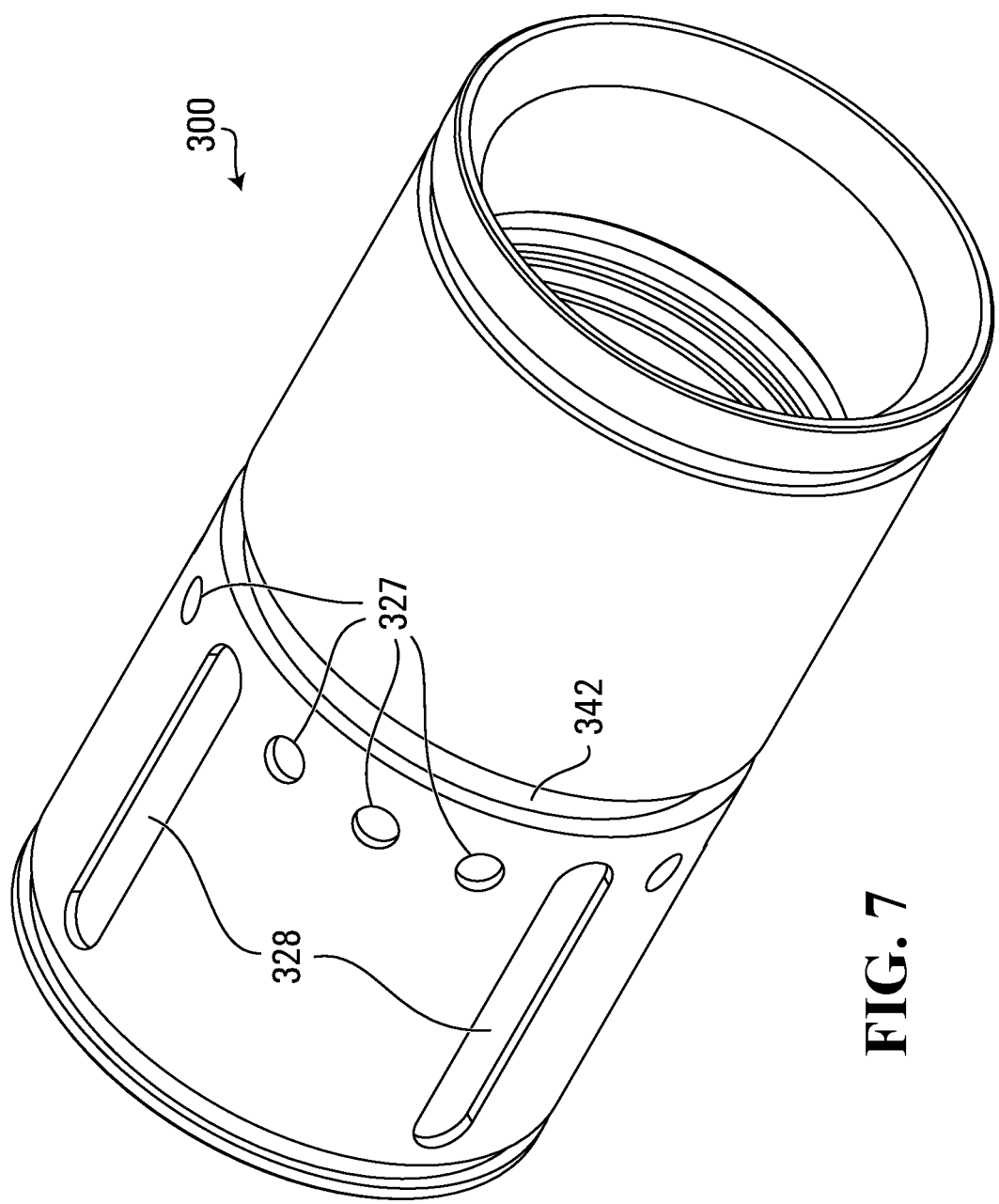
FIG. 7 is a top-perspective view of a sleeve in the section of the well tubing of FIG. 6.

A slidable sleeve 300, as shown in isolation in FIG. 7, may be mounted inside internal bore 202 of tubing 200 (as shown in FIG. 8) to selectively block ports 232 of an interval 528a-c. Sleeve 300 may be slid into tubing 200 to open ports 232 (as shown in FIG. 9).

Sleeve 300 may have one or more longitudinal slots 328 in an outer surface thereof, each to receive a pin 226 of tubing 200. In one example, the lower unthreaded shaft of a pin 226 engages a longitudinal slot 328. The movement of the sleeve 300 is thereby limited by the pins 226, as pins 226 collide with the sides of the longitudinal slots 328. Pins 226 may therefore guide the movement of sleeve 300 along the length of tubing 200. Pins 226 may also prevent sleeve 300 from rotating/spinning inside tubing 200.

Sleeve 300 may also have counterbores 327. Shear pins 228 may be positioned in pin holes 227 in tubing 200 and in counterbores 327 in sleeve 300 so as to retain sleeve 300. Shear pins 228 may break when a sufficient pressure is applied on sleeve 300 by dart 100, thereby allowing sleeve 300 to slide open.

Sleeve 300 may have an annular groove 342 around the outer surface of the sleeve. A C-ring 340 may be attached to annular groove 342. C-ring 340 may be made of a metal, such as steel. C-ring 340 may be sized and configured to fit around annular groove 342 but in its natural state protrudes above the external surface of sleeve 300. C-ring 340 is resilient and can be compressed inward to fit within groove 342, so that when sleeve 300 is inserted into tubing 200 with C-ring 340 mounted thereon, C-ring 340 pushes against the inner wall of tubing 200 but allows sleeve 300 to slide within tubing 200 before sleeve 300 reaches the position where groove 342 is aligned with internal groove 242 on tubing 200 (this position is referred to herein as the open position as when sleeve 300 is at this position ports 232 are "open"). When sleeve 300 is moved to the open position, the space provided by groove 242 allows C-ring 340 to spring back to its natural state and protrude above groove 342, therefore functioning as a stopper for locking sleeve in the open position. Thus, once sleeve 300 is in the open position, C-ring 340 can engage both groove 342 and groove 242 in the inner wall of tubing 200 to secure sleeve 300 in the open position (FIG. 9).

Sleeve 300 also includes a seat structure 350 (FIGS. 8-9) mounted therein. Seat structure 350 may have a wall 314 that defines an inner opening through which dart 100 may pass through when in the inactive state but cannot pass through when in the activated state. In the inactive state, protrusions 111 of fingers 115 can contact wall 314 and cause dart 100 to experience an impact exceeding the threshold level. Terminal tips 116 of fingers 115 however can bend by the force of the impact, thus allowing dart 100 to pass through seat structure 350. However, the inner opening of the seat structure 350 is sized and shaped so as to prevent dart 100 from passing through if terminal tips 116 of fingers 115 cannot bend inwardly towards the housing wall. Thus, when in the activated state (i.e. when fingers 115 are non-collapsible), dart 100 will engage and seat at seat structure 350. In effect, seat structure 350 provides a narrow inner opening through which dart 100 is allowed to pass through only when dart 100 is in the inactive state.

Wall 314 and inner opening of seat structure 350 may also be shaped to interact with terminal tips 116 to cause dart 100 to experience a physical impact having an impact level exceeding the threshold level when passing through.

Figure 10:
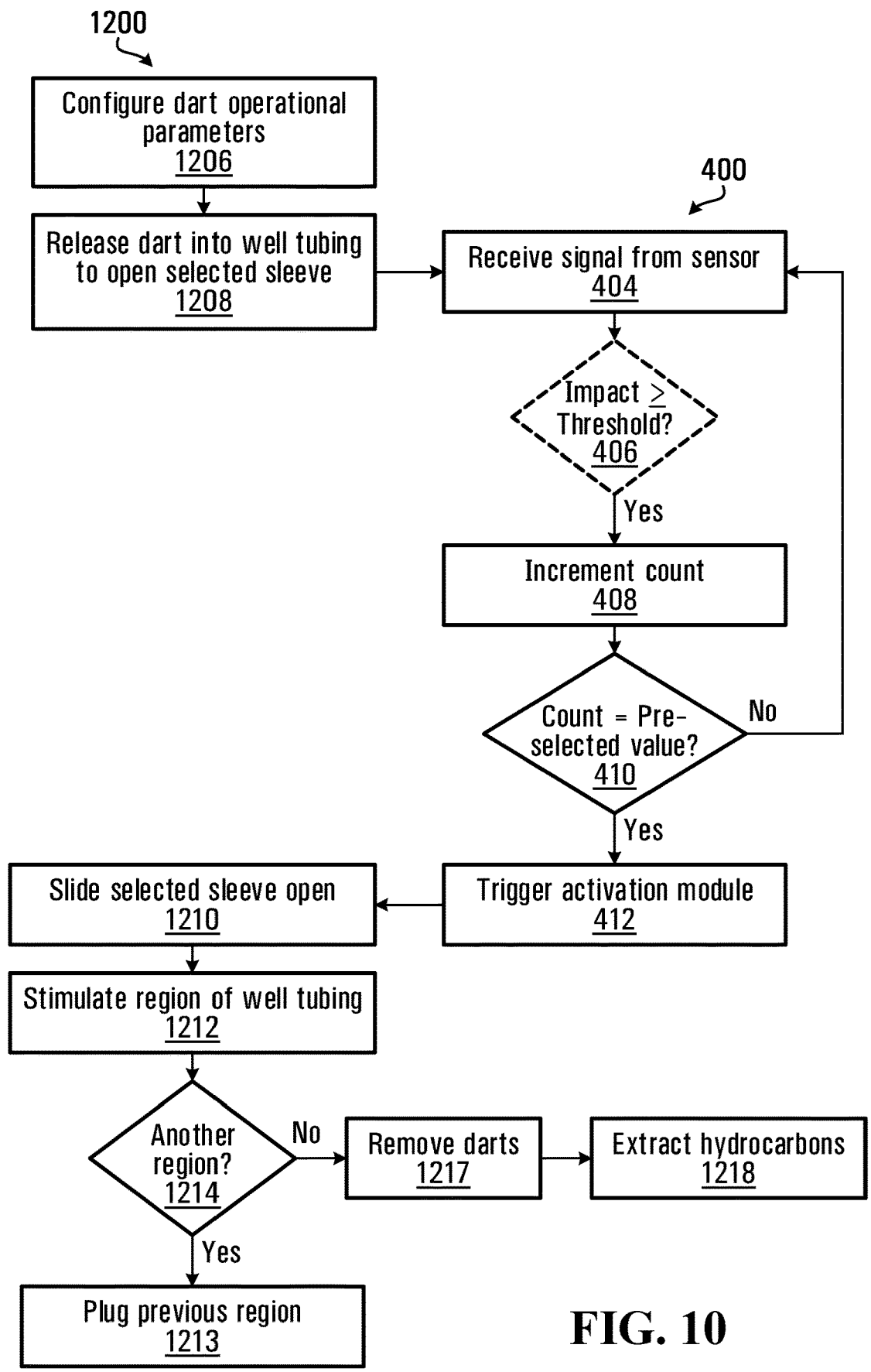
FIG. 10 is a flowchart illustrating a method for operating the device of FIG. 1 in the well system of FIG. 5.

FIG. 10 shows a flow-chart of a method 1200 for using dart 100 in the operation of a multi-interval wellbore, such as wellbore 506 of well system 500 (FIG. 5).

Figure 11A:
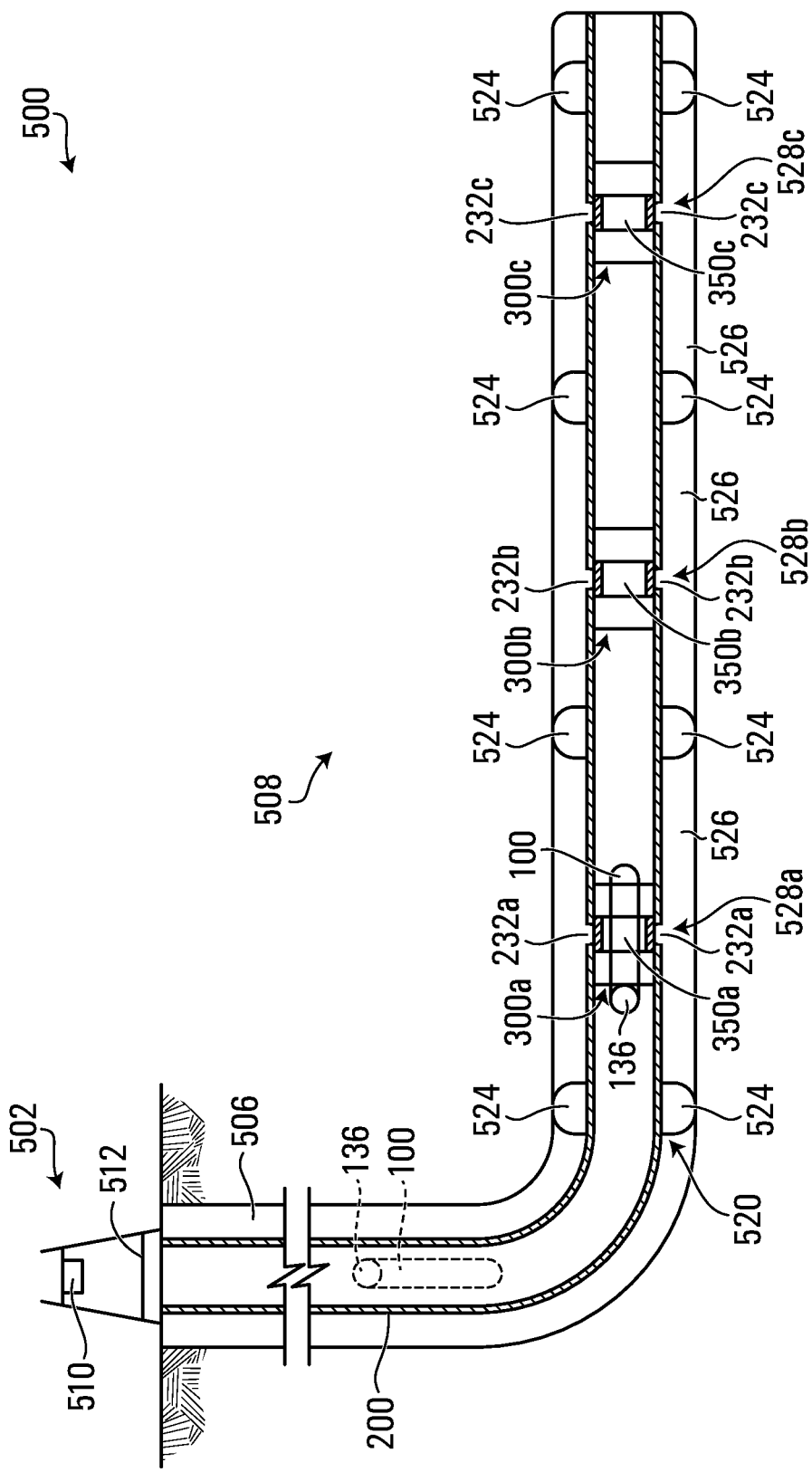
FIG. 11A-11E shows a schematic cross-section view of the device of FIG. 1 in the well system of FIG. 5.
Figure 11B:
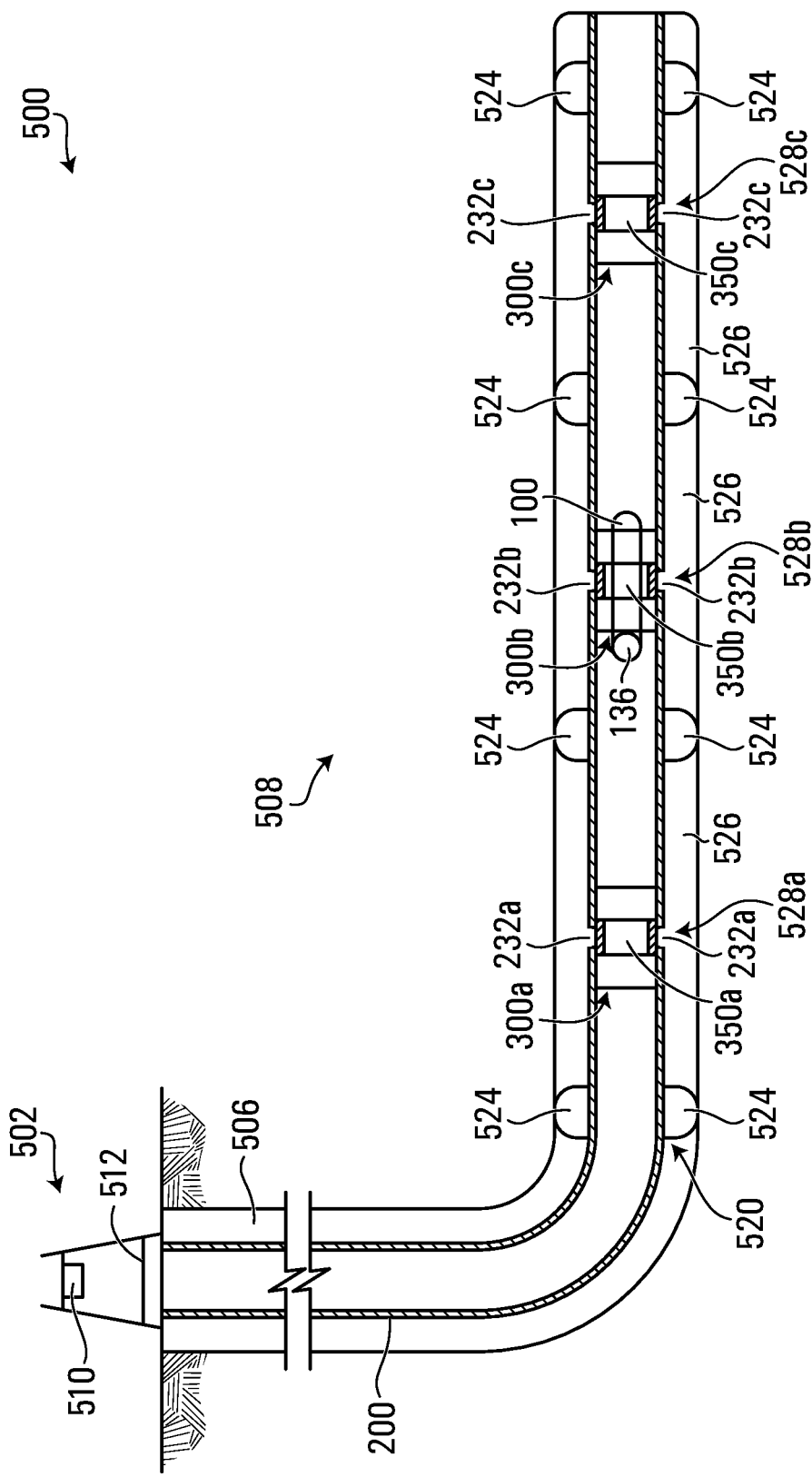

At 1206, operational parameters of dart 100 are configured. Example operational parameters that may be configured include the threshold level of sensor 120 and the count at which dart 100 is activated. In one example, one of multiple sliding sleeves 300 is selected for actuation and dart 100 is configured to target the selected sliding sleeve 300 for actuation. In one embodiment, the downhole most sliding sleeve 300c is selected for actuation first followed by the next downhole-most sliding sleeve 300b, until the upholemost sliding sleeve 300a is reached. In this regard, processor 122/counter 140' receives a pre-selected value corresponding to a number of impacts exceeding a threshold level which dart 100 is configured to detect prior to activation. For example, in the depicted configuration shown in FIGS. 11A-11C, to target sliding sleeve 300c, the pre-selected value may be set to 2, because dart 100 needs to pass through two (2) uphole sleeves 300a and 300b before reaching sleeve 300c.

Processor 122 (FIG. 4A) may receive the pre-selected value via I/O interface 124, and the value may be stored in settings 144. Similarly, counter 140' (FIG. 4B) may receive the pre-selected value via input interface 124'.

Optionally, at 1206, the threshold level of sensor 120 may also be set and stored in settings 144.

Figure 11C:
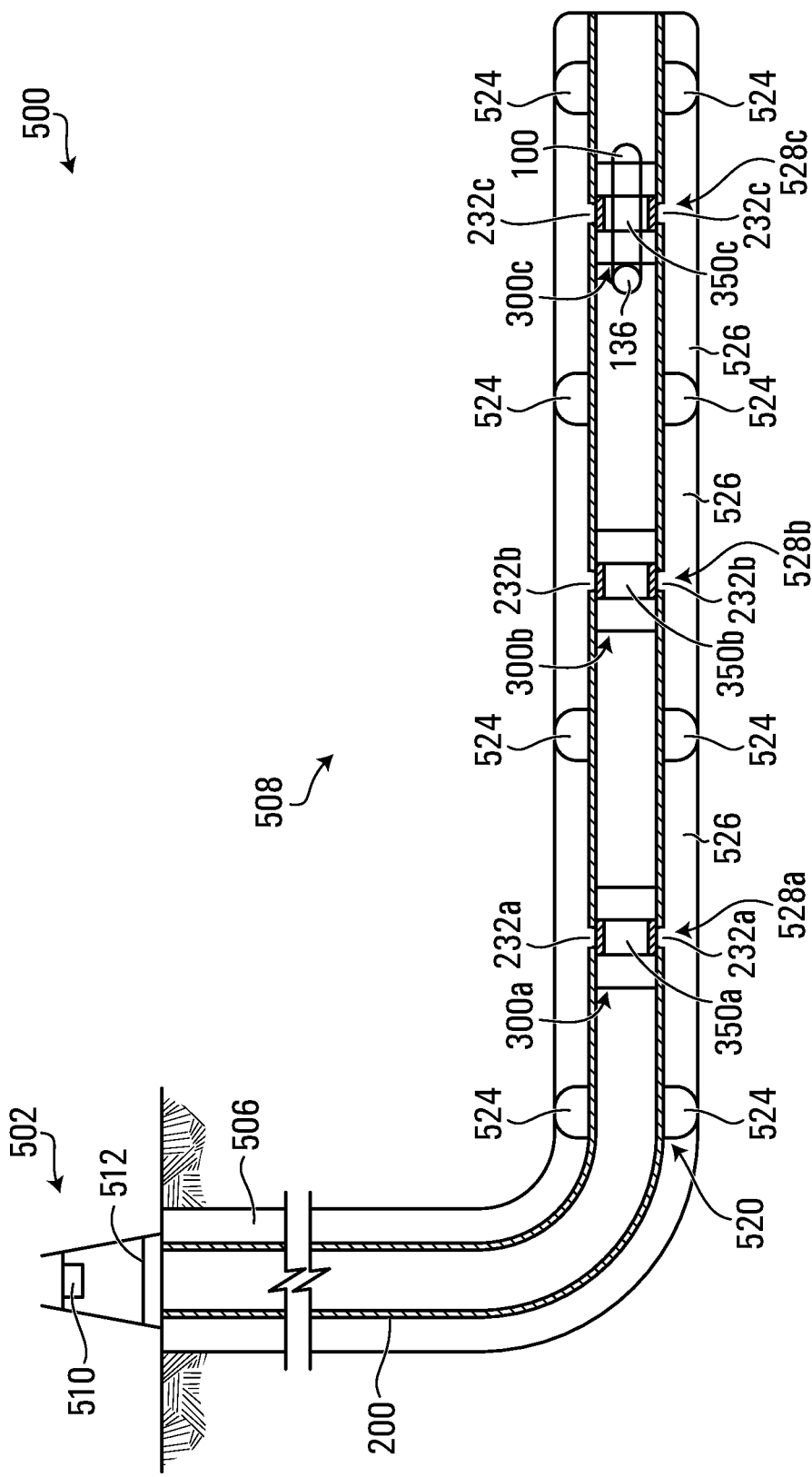

Once the operational parameters are configured, dart 100 is released into well tubing 200, which may be filled with a fracking fluid, at 1208, to actuate the selected sliding sleeve 300. For example, to actuate sliding sleeve 300c, once released, dart 100 travels through well tubing 200 through sliding sleeve 300a and seat structure 350a (FIG. 11A), through sliding sleeve 300b and seat structure 350b (FIG. 11B) until it reaches sliding sleeve 300c and seat structure 350c (FIG. 11C). The fracking fluid in well tubing 200 interacts with foil 156 (FIG. 1) to generate a force which propels dart 100 forward through well tubing 200.

As dart 100 travels within well tubing 200, dart 100 performs the steps of method 400. Method 400 illustrates an example method for activating dart 100 as it travels through tubing 200. Steps of method 400 may be performed by processor 122 of control circuit 114 of FIG. 4A or by control circuit 114' of FIG. 4B.

As dart 100 travels within well tubing 200, dart 100 will experience varying levels of physical impacts, such as shocks (for example, due to changes in fluid pressure, due to contact with the inner walls of well tubing 200 or other structures in the well tubing 200, due to contact of terminal tips 116 with seat structures 350 within well tubing 200, and so forth). When dart 100 contacts internal components in tubing 200, the impact may be detected by sensor 120.

When method 400 is implemented by control circuit 114 (FIG. 4A), after an impact, at 404, processor 122 receives a signal from sensor 120. If sensor 120 is an impact level sensor, in response to receiving the signal from sensor 120, processor 122 determines, at 406, if the level of impact detected is greater than or equal to the threshold impact level. If so, the impact count is incremented at 408. On the other hand, when sensor 120 is a "go/no-go" sensor, processor 122 increments the count at 408 (i.e. skipping 406) in response to receiving each signal from sensor 120, as "go/no-go" sensor only provides a signal when the level of impact is greater than or equal to the threshold impact level. At 410, processor 122 determines if the count is equal to the pre-selected value corresponding to the number of impacts exceeding the threshold level which dart 100 is configured to detect prior to activation. If so, processor 122 triggers actuator 126 at 412, thereby activating dart 100. If not, method 400 returns to 404.

When method 400 is implemented by control circuit 114' (FIG. 4B), after an impact, at 404, counter 140' receives a signal from "go/no-go" sensor 120' and increments the count at 408 (i.e. skipping 406) in response to receiving the signal from sensor 120'. At 410, if the count is equal to the pre-selected value, method 400 proceeds to 410, and control circuit 114' triggers actuator 126, thereby activating dart 100. If not, method 400 returns to 404.

In one embodiment, triggering actuator 126 causes sleeve 118 to slide towards uphole end of dart 100, thereby locking sleeve 118 in the activated position. In the activated position, fingers 115 engage locking mechanism 130 which supports sleeve 118 in a protruded position, and can no longer bend inward so dart 100 cannot pass through the seat structure in the next target sleeve 300c.

Before dart 100 contacts seat structure 350a (FIG. 11A), the impact count is initially set to 0 and dart 100 is in the inactive state and will pass through seat structure 350a. The contact with seat structure 350a will produce a physical impact that exceeds the pre-selected threshold impact level, thus sensor 120 detects the impact and provides a signal to processor 122 or counter 140', and the processor 122/counter 140' in response increments the impact count 140 from 0 to 1. As 1 is less than 2, the dart 100 is still in the inactive state when it contacts seat structure 350b (FIG. 11B), so dart 100 can also pass through seat structure 350b. The impact caused by dart 100 contacting seat structure 350b will exceed the threshold level so the impact count is incremented from 1 to 2. At this point, dart 100 is activated. Impacts with seat structure 350a and with seat structure 350b may cause dart 100 to slow down.

As can be appreciated by those skilled in art. terminal tips 116 of fingers 115 are squeezed upon impact with seat structure 350a and with seat structure 350b (FIG. 13), and can bend inward as they are not supported and there is a gap between the terminal tips 116 and the housing 117, thereby permitting dart 100 to pass through seat structures 350a, 350b. A component of the force of impact of terminal tips 116 with seat structure 350 is along the longitudinal axis of dart 100 and tubing 200 (axis l). Since terminal tips 116 are allowed to bend inward generally along the radial direction of dart 100 and tubing 200 (axis r), a component of the force in the radial direction causes terminal tips 116 to bend towards external surface 112 of housing 117. Such bending provides the needed clearance for dart 100 to continue traveling within tubing 200 in the inactive state (see FIGS. 12 and 13).

As noted, after the impact count 140 reaches the selected threshold value, "2" in the depicted example, dart 100 is activated. That is, dart 100 is activated after passing through sleeve 300b so that dart 100 reaches sleeve 300c in the activated state (FIG. 11C).

Figure 14:
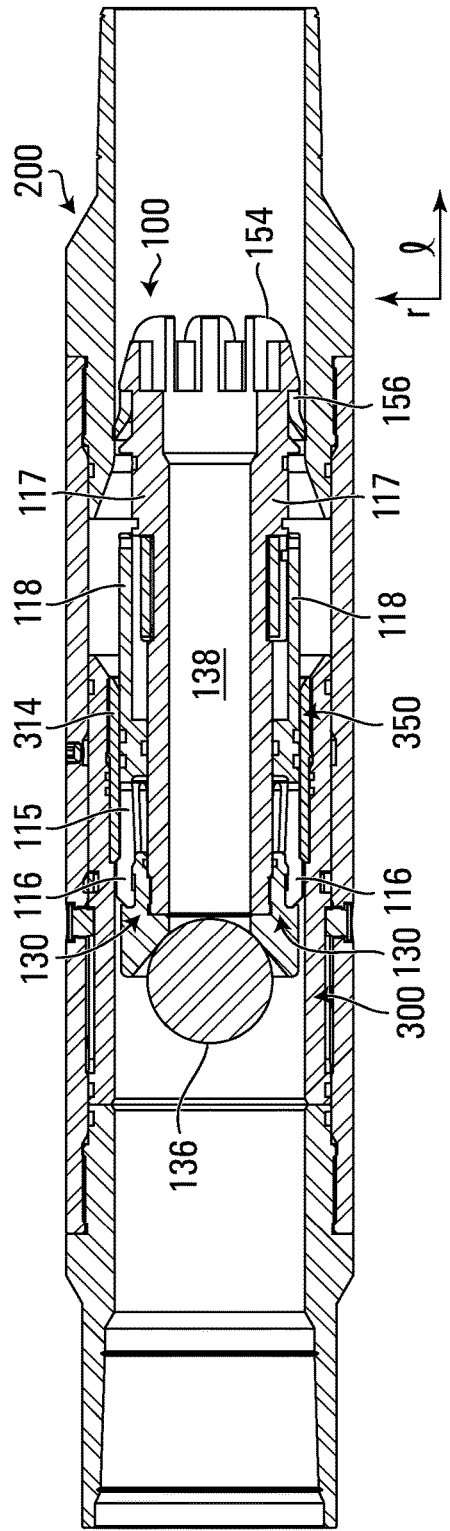
FIGS. 14 and 15 are cross-section views illustrating seating of the device of FIG. 1 in a target sleeve in the well system of FIG. 5, and actuation of the target sleeve from the closed position to the open position, when the device is in the activated state.

Since terminal tips 116 are prevented from bending inward in the activated state, dart 100 cannot pass through and will seat at the selected seat structure 350c (see FIG. 11C and FIG. 14). As better illustrated in FIG. 14, terminal tips 116 are supported in the protruded position by sliding sleeve 118 to uphole end 150 of dart 100 and locking sleeve 118 in that position. Sleeve 118 is moved into the locked position by actuator 126, which is in turn triggered by the controller such as control circuit 114 when the impact count reaches the threshold value of 2.

Figure 15:
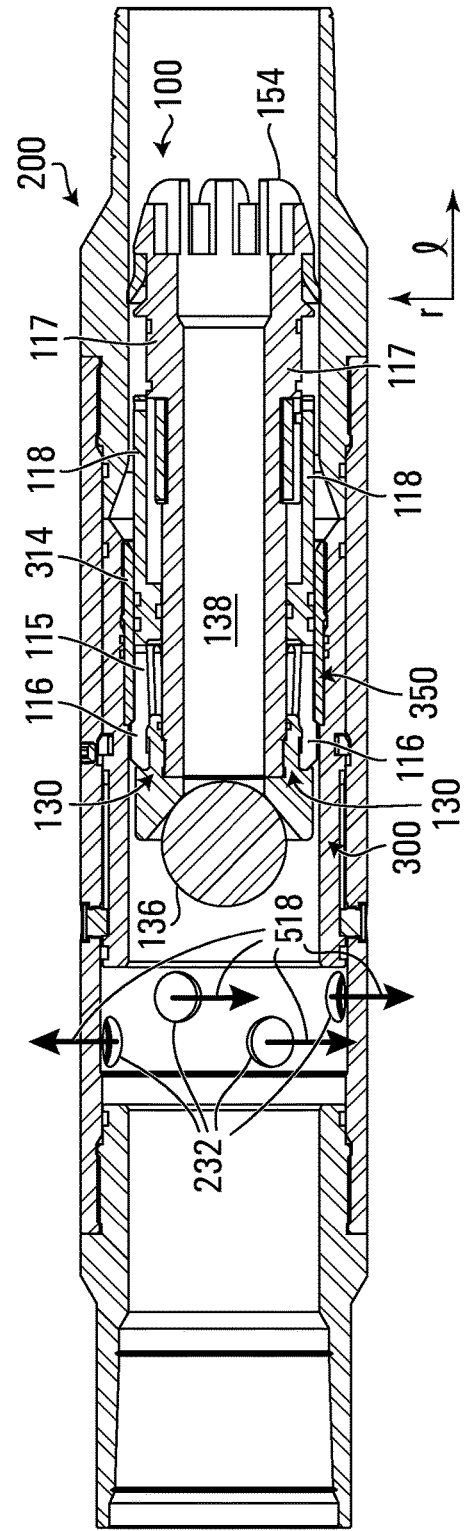

Returning to method 1200, once seated, dart 100 may be used to actuate and slide the selected sleeve 350c to the open position at 1210 (FIG. 15). Foil 156 interacts with the walls of tubing 200 to create a seal which at least partially blocks fluid from flowing around the housing 117 when dart 100 is seated and increases the fluid pressure at uphole end 150. In some embodiments, foil 156 may be made of flexible material, such as a rubber, which allows foil 156 to bend towards the inner walls of tubing 200 in response to increased fluid pressure, thereby creating a tighter seal with the inner walls of tubing 200. Furthermore, dart 100 may have seals attached to ridge structures 162 to improve the seal.

In an embodiment, the force of impact produced by the dart 100 on contact with the seat structure 350c and the increased fluid pressure due to the seal created by foil 156 together may be sufficient to cause the sleeve 300c to slide to the open position, thus opening ports 232 (for example, by breaking shear pins 228 shown in FIG. 6).

In other embodiments, a ball 136 may be conveyed through tubing 200 to contact the dart 100 thereby generating the needed force for opening the sleeve 300c. When ball 136 reaches dart 100, dart 100 receives and retains ball 136 at the receptacle 166. Ball 136 may be retained by receptacle 166 because the fluid pressure and fluid flow may exert a force pushing ball 136 into and against receptacle 166. Ball 136 once seated in the receptacle 166 can block fluid flow through fluid conduit 138, thereby causing an increase in fluid pressure which, along with the increased pressure created by foil 156, may cause sleeve 300c to slide to the open position. In some cases, the impact generated the ball 136 contacting dart 100 may be sufficient for actuating the sleeve 300c.

In other embodiments, ball 136 may be attached to dart 100 when the dart 100 is released into the tubing 200, and travel with dart 100 through tubing 200. Once seated at seat 350c, the resulting increased fluid pressure then causes sleeve 300c to slide to the open position.

Figure 11D:
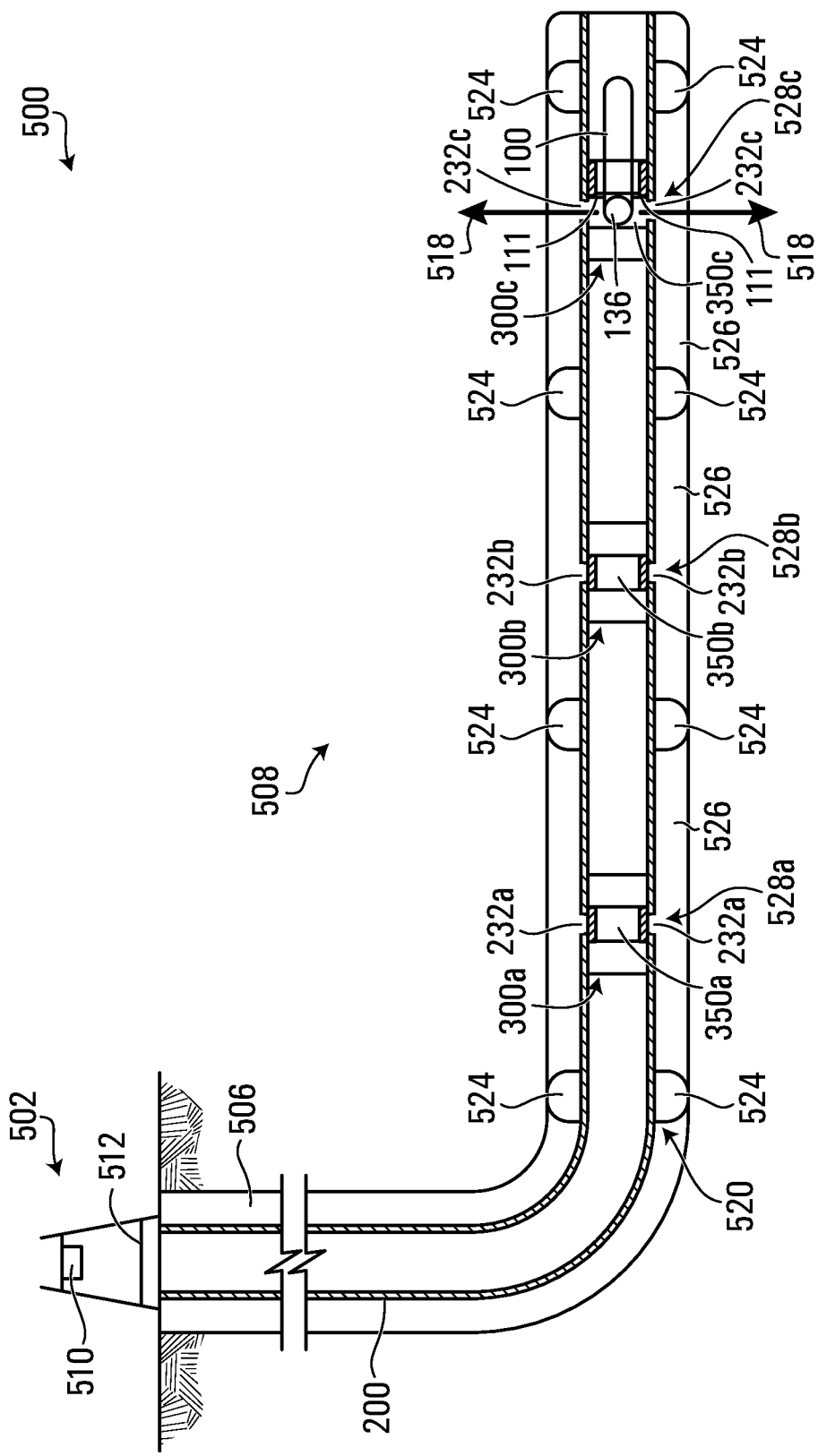

At 1212, the region 528c corresponding to the selected sleeve 300c may be stimulated. Stimulation of the interval may include pumping fracking fluid 518 at a high pressure through the open ports of that interval to fracture the rock formation 508 (FIGS. 11D and 15).

At 1214, it is determined whether another region from the regions 528a-c is to be stimulated. If so, at 1216, the previous region is plugged (i.e. region 528c). The region 528c may be plugged by conveying ball 136 to dart 100 at sleeve 300c, thereby plugging fluid conduit 138 of dart 100. Step 1216 may be skipped if ball 136 is attached to dart 100 and travels with dart 100 through tubing 200.

Figure 11E:
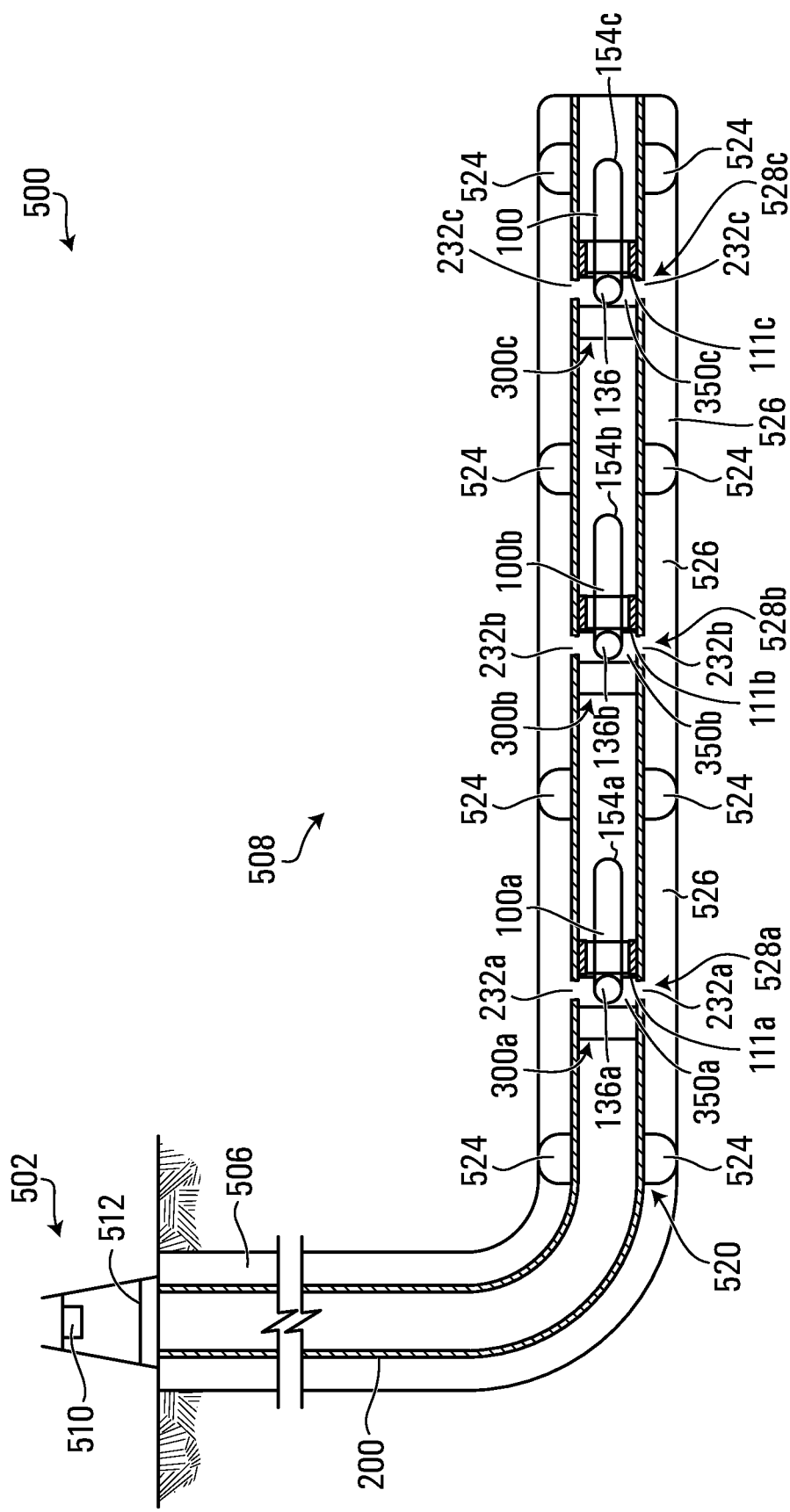
Figure 12:
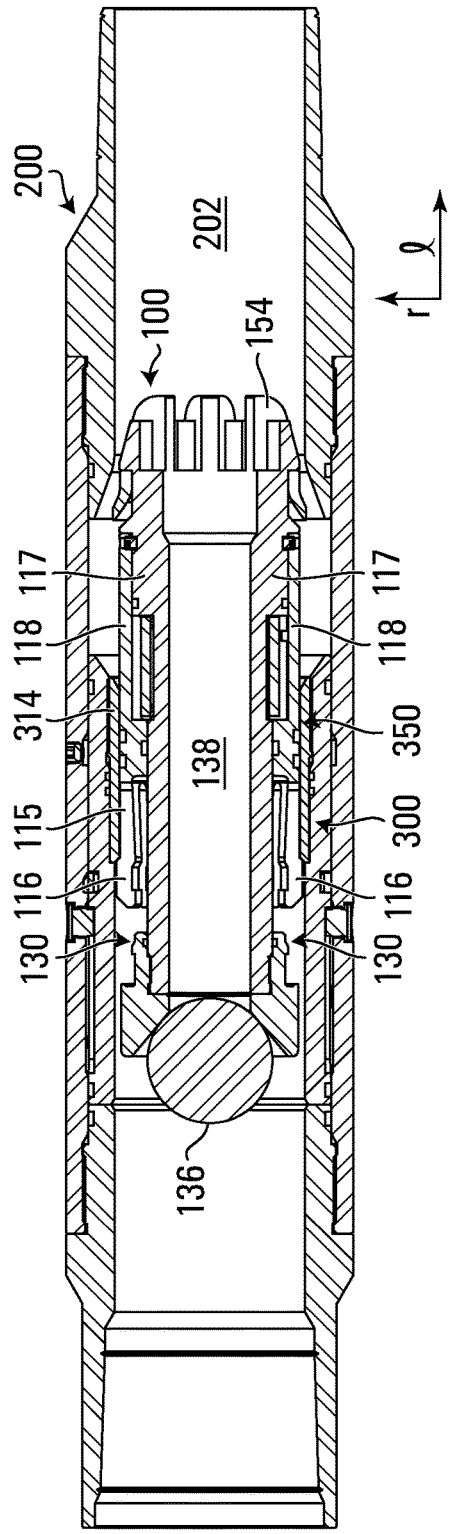
FIGS. 12 and 13 are schematic cross-section views illustrating passing of the device of FIG. 1 through a non-targeted sleeve in the well system of FIG. 5, when the device is in the inactive state.
Figure 13:
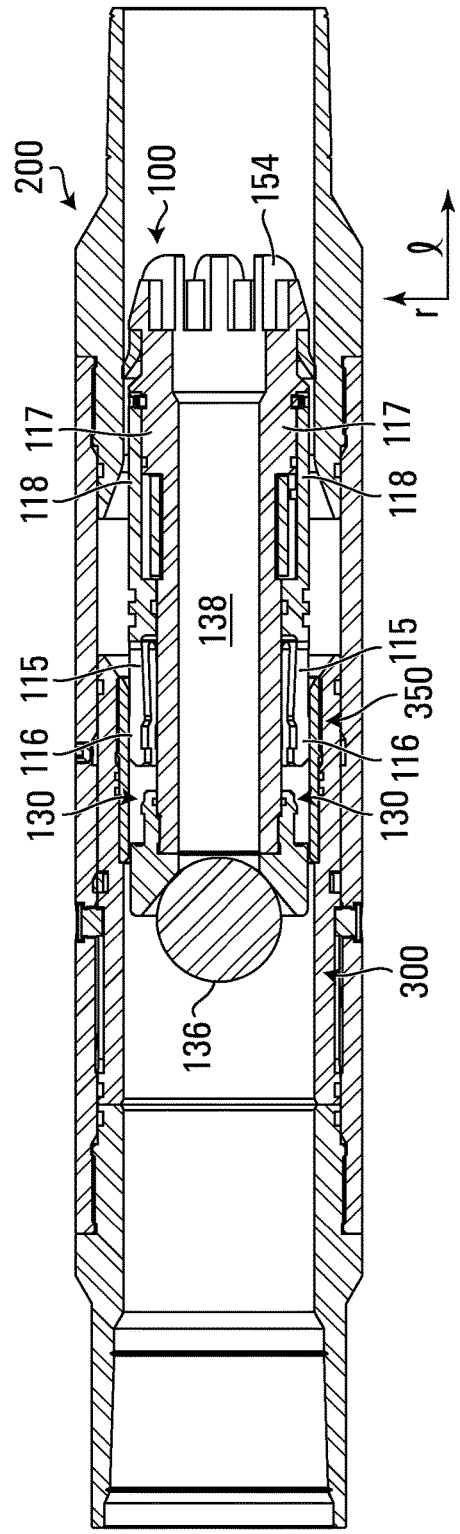

Method 1200 then proceeds to 1206, where a new dart 100 is configured and released into wellbore 506 to open ports 232 associated with region 528b. Method 1200 may be repeated once more to target region 528a. As shown in FIG. 11E, once regions 528a-528c are stimulated, darts 100a-100c and balls 136a-136c remain seated at seats 350a-350c due to protrusions 111a-111b of the darts being supported and unbendable.

Downhole operations may therefore be conducted in stages by conveying successive pre-configured darts 100, each targeting a sleeve 300 at a different region 528. After all regions 528a-528c are stimulated, darts 100a-100c and balls 136a-136c may be removed at 1217 to allow for the hydrocarbon extraction process to commence at 1218.

To allow for easy removal of the darts 100a-100c, the housing of darts 100a-100c may be made of a material that degrades or dissolves upon contact with dissolving fluids. Examples of such materials include magnesium-based alloys and aluminum-based alloys. Thus, after stimulating regions 528a-528c, dissolving fluids may be pumped down tubing 200 to dissolve darts 100a-100c.

Alternatively, housing 117 may be made of drillable material, such as ductile iron of grade 80-55-06. After stimulating regions 528a-528c, a drill may be used to drill through darts 100a-100c.

Alternatively, darts 100a-100c and balls 136a-136c may be pumped up to the surface along with a fluid. Balls 136a-136c may become detached from darts 100a-100c and flow up separately from the darts. Protruding members 154 at the downhole end of each dart prevent the balls from blocking the flow of fluids. For example, while ball 136c may detach from dart 100c and seat at protruding members 154b of dart 100b, fluid can still flow through the sides of dart 100b, 100c.

Dart 100 therefore includes a sensor 120 for detecting a level of shock experienced by the dart as it travels through the well tubing. When inactive, dart 100 impacts seat structures 350 in well tubing 200, and upon impact with each seat structure 350 experiences an impact having a level of impact exceeding a threshold level. Sensor 120 provides a signal indicating that dart 100 has experienced an impact having the level of impact exceeding a threshold level, thereby causing dart 100 to increment a count of the number of seat structures 350 it has traversed. Once dart 100 determines that it has traversed a pre-selected number of seat structures 350, dart 100 is activated. Once activated, dart 350 can no longer pass through seat structures 350 in well tubing 200, and seats at the next seat structure 350 it encounters.

Count 140 is not incremented unless the dart experiences an impact level exceeding a threshold level. To avoid incrementing count 140 unless dart 100 has impacted a seat structure 350, the threshold level of impact for incrementing count 140 may be maintained at a higher level than the level of impact between the dart and other structures in the tubing. Thus, false positives may be avoided.

Dart 100 also does not rely on detecting any external stimuli; sensor 120 measures the movement of dart 100 as it travels within the tubing. In contrast, a sensor that is responsive to an external stimuli within tubing 200 or to control signals from rig 502 may fail to detect the external stimuli or control signals due to the fast pace of movement of the dart and the harsh environmental conditions in tubing 200. Thus, sensor 120 is less prone to failure of detecting that dart 100 has traversed a seat structure 350 within tubing 200.

Dart 100 also operates autonomously without communicating with other devices as it travels through tubing 200. For example, dart 100 does not require control signals from external devices while dart 100 is in tubing 200. Communication with other devices may be unpredictable due to the harsh environmental conditions in the tubing. Thus, by operating autonomously, dart 100 eliminates the point of failure associated with communicating with external devices and may be more reliable.

The structure of dart 100 may be modified in various embodiments. Dart 100 has a protrusion 111 on a surface structure thereof which impacts a restriction in tubing 200. Different techniques may be used to configure dart 100 to experience an impact having an impact level that exceeds the threshold level. Protrusion 111 is further configured to collapse upon impact with the restriction when dart 100 is inactive, thereby allowing dart 100 to pass through the restriction in tubing 200. Different techniques may be used to collapse protrusion 111 upon impact with the restriction in tubing 200 when dart 100 is inactive.

Protrusion 111 is further configured to remain in a protruding position upon impact when dart 100 is activated, thereby causing dart 100 to seat at the restriction and to actuate a tool at the restriction. Different techniques may be used to support protrusion 111 in a protruding position upon impact with the restriction in tubing 200 when dart 100 is activated.

In one example embodiment, housing 117 of dart 100 may have a diameter in the range of 6 to 12 centimeters, a length in the range of 30 to 40 centimeters, and a weight in the range of 3 to 7 kg. In one embodiment, fluid conduit 138 may have a diameter of 2 to 5 centimeters near uphole end 150. In one embodiment, fluid conduit 138 may be wider at downhole end 152 than at uphole end 150. In one embodiment, cut-out 160 is approximately 5 to 8 centimeters long, 2 to 3 centimeters wide, and 1 to 2 centimeters in thickness.

In one embodiment, each finger 115 may be 1 to 3 centimeters wide and 5 to 8 centimeters long. In example embodiments, the number of fingers 115 may range from 8 to 15 fingers. The number of fingers 115 chosen may vary in dependence on the diameter of housing 115 and the width of each finger.

In some embodiments, the controller such as control circuit 114 may be configured to monitor the physical impacts experienced by the dart 100, and activate the surface structure 110 when the monitored physical impacts indicate that the dart 100 is next reaching the target seat structure in the target sleeve or target tool. For example, in selected embodiments, each seat structure 350 may be configured to generate one or more physical impacts with an identifiable impact profile when the dart 100 passes through the seat structure 350. The control circuit 114 may be configured to monitor the position of the dart 100 in the well tubing 200 based on the impact profiles of the seat structures 350 already passed by the dart 100 and determine if the dart 100 is next reaching the target seat structure based on the position of the dart 100.

In some embodiments, the impact profile of each seat structure 350 may comprise two or more peaks exceeding the threshold level. For example, the wall 314 and inner opening of a seat structure 350 may be shaped to provide two or more separate but closely adjacent restriction points (impact points) which interact with terminal tips 116 of the dart 100 to cause dart 100 to experience two separate physical impacts each having an impact level exceeding the threshold level when passing through. If all of the seat structures 350 have the same number of restriction points (thus same number of impact peaks in the impact profiles), the control circuit 114 may determine the number of seat structures passed by the dart 100 by dividing the total number of detected physical impacts exceeding the threshold level by the known number of restriction points. As can be appreciated by those skilled in the art, when the seat structures 350 produce two or more impact peaks exceeding the threshold level within a short time period, it helps to identify the passing of the seat structure and reduce the possibility of false positive, thus improving the accuracy of the count or identification of the seat structures 350 that have been passed by the dart 100. In this case, the control circuit 114 can increment the count of passed seat structures or physical impacts only when there are a pre-determined number of consecutive physical impacts exceeding the threshold level within a selected time interval and increment the count by only one for the predetermined number of consecutive physical impacts. For example, if each seat structure 350 generates 2 physical impact peaks over the threshold level, the seat count may be incremented by only one for every two physical impacts detected by the sensor 114.

Figure 16A:
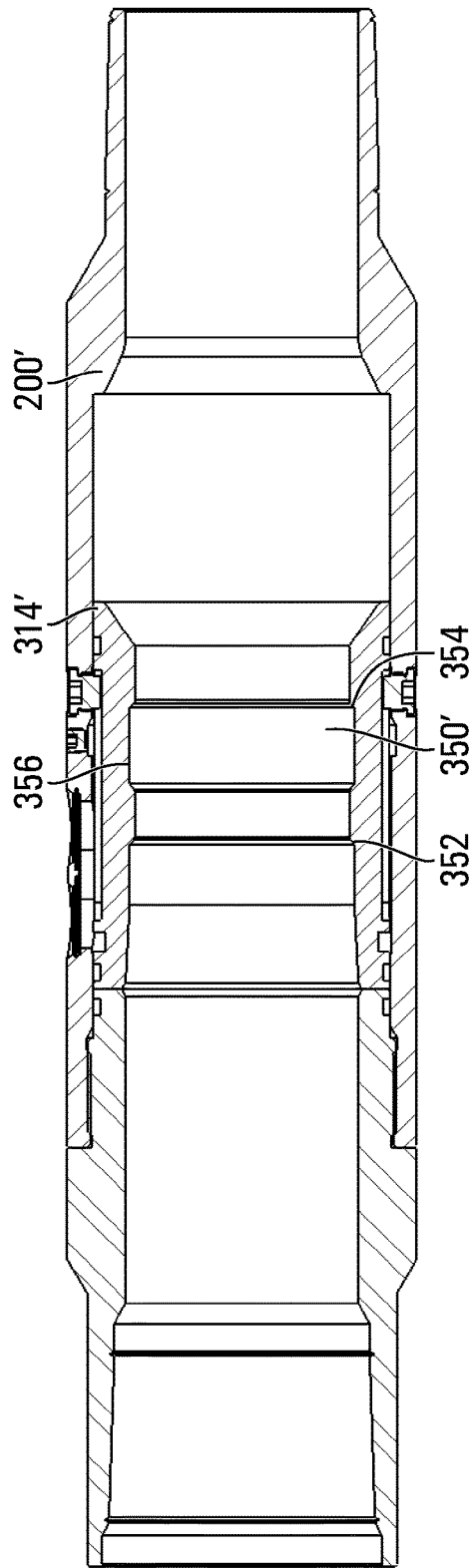
FIGS. 16A and 16B are cross-section views of a sleeve having a seat structure, according to an alternative embodiment, wherein the seat structure is at respective positions.
Figure 16B:
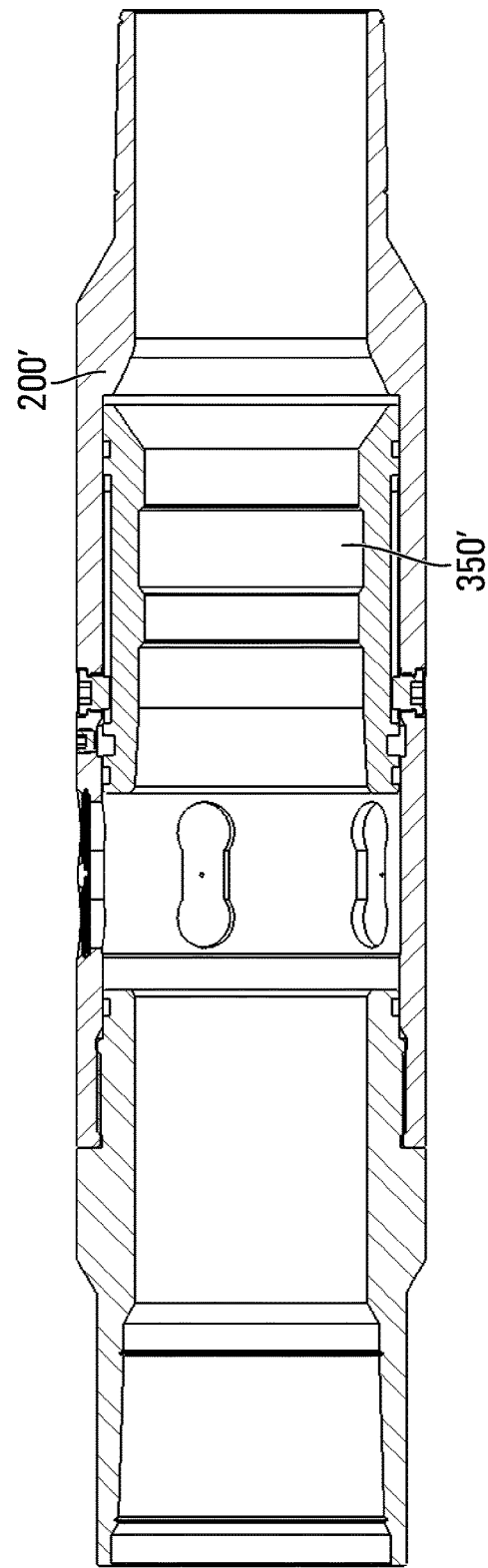

For example, an integrated sleeve-seat structure 350' mounted in a well tubing 200' is illustrated in FIGS. 16A and 16B, where the integrated sleeve-seat structure 350' is at the closed position in FIG. 16A and at the open position in FIG. 16B. Tubing 200' is similar to tubing 200 as described above. Integrated sleeve-seat structure 350' is similar to sleeve 300 with seat structure 350 except the differences discussed next. Instead of providing one restriction (impact point) as with seat structure 350 in sleeve 300, the tubular wall 314' of the integrated sleeve-seat structure 350' is configured to provide two impact points 352 and 354. In the depicted example, the first impact point 352 may be sized and shaped as the impact point in the seat structure 350 as illustrated in FIGS. 8 and 9, and the second impact point 354 is provided by an enlarged section 356 in the inner opening of the integrated sleeve-seat structure 350'. As can be understood, when the dart 100 is not activated, it can pass through the first impact point 352 and will experience an impact upon contacting the wall 314' at impact point 352. The terminal tips 116 of fingers 115 of the dart 100 however can subsequently expand in the enlarged section 356 and thus the dart 100 will experience another physical impact when contacting the second impact point 354. The impact level or profile of the impact at the second impact point 354 may be adjusted by changing the size of the inner opening at the impact point 354, or the length and size (inner diameter) of the enlarged section 356, or any combination of these features. When the dart 100 is activated before reaching the seat structure 350', it will seat in the seat structure 350' at the first impact point 352.

In different embodiments, the two impact points 352 and 354 may be sized to provide different physical impacts with different impact levels or characteristics. For example, the first impact point 352 may provide a slightly lower or higher physical impact than the second impact point 354. The seat structure 350' may also be configured to seat the dart 100 at the second impact point 354 when the dart 100 is activated.

Thus, the integrated sleeve-seat structure 350' may be sized and shaped to interact with terminal tips 116 of the dart 100 to cause dart 100 to experience two physical impacts each having an impact level exceeding the threshold level when passing through.

Figure 17:
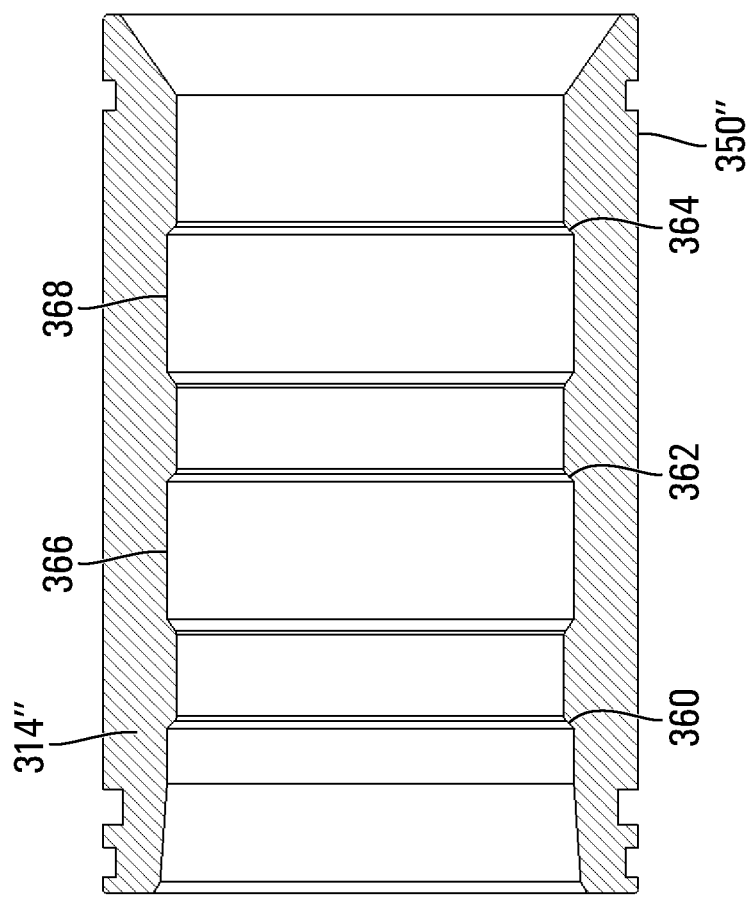
FIG. 17 is a cross-section view of another seat structure, according to a further alternative embodiment.

FIG. 17 illustrates another embodiment of an integrated sleeve-seat structure 350" with three impact points 360, 362, 364, and two enlarged sections 366, 368. Integrated sleeve-seat structure 350" is similar to sleeve-seat structure 350' but with an additional impact point, thus providing a different impact profile. In alternative embodiments, a seat structure may have more than three impact points.

In some embodiments, each seat structure 350, 350', 350" may be configured to have a unique identifiable impact profile and different seat structures 350, 350', 350" may have different impact profiles, so that the seat structure just passed by the dart 100 can be identified by the controller such as control circuit 114 based on the impact profile of the seat structure. For example, the impact profile of each seat structure may have a different number of impact peaks, such as 2, 3, 4, 5, . . . and so on. By determining the number of impact peaks in the impact profile, the controller can determine the particular seat structure just passed by the dart 100 and thus the position of the dart 100 in the well tubing 200, and its relative position to the target seat structure 350. As can be appreciated, it is not necessary to determine the precise location of the dart 100 in the well tubing 350; it would be sufficient to know that the dart 100 is at a position to reach the target seat structure next (i.e. there is no other seat structure downstream of the dart 100 between the dart 100 and the target seat structure) before activating the surface structure 110 of dart 100.

In other words, each seat structure 350 may be configured to produce a signature impact profile and can be identified based on the signature impact profile. When the seat structures 350 have uniquely identifiable or signature impact profiles, it is not necessary to count the number of physical impacts. Instead, the controller such as control circuit 114 may process and analyze the signals received from the sensor 120 to determine if the monitored physical impacts have impact profiles, such as certain impact characteristics or features, that match impact profiles of the seat structures 350 of interests such as the seat structure 350 that is just before the target seat structure 350. When there is a match, it can be determined that the dart 100 has just passed the corresponding seat structure.

The impact profiles or data representative of the impact profiles of the seat structures 350 may be pre-stored stored in a memory on the dart 100. The impact profile may be a full profile indicating the time dependence of the impact level over a time period. The impact profile may also be represented by data indicative of the characteristics of the physical impact, such as the peak amplitude, the time interval between adjacent peaks, and other features and characteristics of the physical impact as discussed elsewhere in this disclosure or can be understood by those skilled in the art.

An integrated sleeve-seat structure such as the examples illustrated herein can also be sized to provide an inner passage channel that has a similar size or diameter to the inner diameter of the well tubing such as tubing 200 or 200', as illustrated in FIGS. 8, 9, and 16A-16B. For example, as depicted in the figures, an integrated sleeve-seat structure 45 may be configured so that the inner opening in the integrated sleeve-seat structure may be generally flush with the inner channel of the well tubing. Conveniently, such a configuration of the integrated sleeve-seat structure can reduce the restriction on fluid flow through the sleeve-seat structure and the well tubing when the dart 100 is not seated at the seat structure. In comparison, a conventional seat such as a ball seat for seating a ball in a conventional sleeve in a well tubing typically has an inner fluid path sized much smaller than the fluid path in the well tubing, and thus substantially restricts or impedes the fluid flow through the ball seat due to the narrower opening at the ball seat.

Concluding Remarks

Selected Embodiments of the present invention may be used in a variety of fields and applications.

Other features, modifications, and applications of the embodiments described here may be understood by those skilled in the art in view of the disclosure herein.

It will be understood that any range of values herein is intended to specifically include any intermediate value or sub-range within the given range, and all such intermediate values and sub-ranges are individually and specifically disclosed.

The word "include" or its variations such as "includes" or "including" will be understood to imply the inclusion of a stated integer or groups of integers but not the exclusion of any other integer or group of integers.

It will also be understood that the word "a" or "an" is intended to mean "one or more" or "at least one", and any singular form is intended to include plurals herein.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

Of course, the above described embodiments of the present disclosure are intended to be illustrative only and in no way limiting. The described embodiments are susceptible to many modifications of form, arrangement of parts, details and order of operation. The invention, rather, is intended to encompass all such modification within its scope, as defined by the claims.

What is claimed is:

1. A device comprising:
   a housing configured to travel within a well tubing, wherein a plurality of seat structures are mounted in the well tubing, each one of the seat structures comprising a seat to seat the device thereon;
   a surface structure on an external surface of the housing, having an inactive state and an activated state, and being configured to (i) allow the device to travel through the seat structures when the surface structure is in the inactive state or (ii) to seat in a selected one of the seats in the well tubing when the surface structure is in the activated state, wherein the device is configured to experience a physical impact having an impact level exceeding a threshold level when passing through each one of the plurality of seat structures;
   a sensor enclosed in the housing, configured to generate signals in response to physical impacts experienced by the device, each one of the signals indicative of a level of one of the physical impacts; and
   a controller housed in the housing and in communication with the sensor to receive the signals from the sensor, wherein the controller is configured
   to determine, based on the signals received from the sensor, whether the level of each physical impact experienced by the device exceeds the threshold level, to count a number of physical impacts experienced by the device with impact levels exceeding the threshold level, discounting any physical impact experienced by the device having an impact level below the threshold level, and to activate the surface structure to the activated state when the number of physical impacts exceeding the threshold level reaches a pre-selected value.

2. The device of claim 1, wherein the sensor comprises a shock sensor.

3. The device of claim 1, wherein the sensor comprises an accelerometer.

4. The device of claim 1, wherein the sensor comprises an acoustic sensor, a gyroscope, a strain gauge sensor, a proximity sensor, a piezoelectric sensor, a piezo-resistive sensor, or a capacitive sensor.

5. The device of claim 1, wherein the signals from the sensor comprise analog signals, and the controller comprises a circuit for processing the analog signals.

6. The device of claim 1, wherein the signals from the sensor comprise digital signals, and the controller comprises a circuit for processing the digital signals.

7. The device of claim 1, wherein the controller comprises a processor and a processor-readable medium, the processor-readable medium storing thereon processor-executable instructions, the processor-executable instructions, when executed by the processor, causing the processor to determine the number of physical impacts.

8. The device of claim 1, wherein the signals from the sensor are indicative of a shock level of the physical impacts.

9. The device of claim 1, wherein the signals from the sensor are indicative of levels of acceleration of the device resulting from the physical impacts.

10. The device of claim 9, wherein the signals from the sensor are indicative of gravitational force (g-force) levels of the accelerations.

11. The device of claim 1, wherein the surface structure comprises a movable structure movable between a first position and a second position on the external surface of the housing, and wherein the surface structure is collapsible when the movable structure is in the first position to allow the device to pass through the plurality of seat structures, and is non-collapsible in the second position to allow the surface structure to engage the selected seat to seat the device in the selected seat.

12. The device of claim 11, further comprising an actuator for moving the movable structure from the first position to the second position, wherein the controller is configured to cause the actuator to move the movable structure when the number of physical impacts reaches the pre-selected value.

13. The device of claim 12, wherein the actuator comprises a micro gas generator.

14. The device of claim 12, wherein the actuator is an electric actuator.

15. The device of claim 12, wherein the movable structure comprises a sleeve slidably attached to the external surface of the housing and a plurality of fingers extending from the sleeve, wherein the fingers comprise terminal tips that are unsupported and bendable towards the housing when the movable structure is in the first position and are supported and unbendable towards the housing when the movable structure is in the second position, the terminal tips of the fingers comprising protrusions configured to engage the selected seat when the tips of the fingers are not bent towards the housing, and the surface structure and housing are configured to lock the movable structure in the second position once the movable structure is moved into the second position.

16. The device of claim 1, wherein the housing comprises a downhole end and an uphole end, and a fluid conduit extending through the housing from the downhole end to the uphole end, and wherein the uphole end comprises a receptacle for receiving and retaining a ball or a plug at the uphole end to close the fluid conduit.

17. The device of claim 1, wherein the device is an autonomous dart.

18. A method comprising: detecting a physical impact experienced by an actuation device while the device is traveling downhole in a well tubing, wherein the detecting is performed by a sensor enclosed in a housing of the actuation device, wherein the actuation device has a surface structure on an external surface of the housing, having an inactive state and an activated state, wherein the actuation device is seatable in a downhole seat in the well tubing when the surface structure is in the activated state, and the actuation device is configured to pass by the downhole seat when the surface structure is in an inactive state; determining, by a controller in the housing in communication with the sensor, whether the physical impact has an impact level exceeding a selected threshold level of impact; incrementing a count of physical impacts experienced by the actuation device only if the impact level exceeds the threshold level, wherein the controller is configured to discount the physical impact if the impact level is below the threshold; and moving the surface structure to an activated state and seating the actuation device in the downhole seat if the count of physical impacts has reached a pre-selected value.

19. The method of claim 18, wherein the physical impact causes a shock to the actuation device and the impact level is a shock level detected by a shock sensor.

20. The method of claim 18, wherein the physical impact causes the actuation device to deaccelerate, and the impact level is a level of acceleration detected by an accelerometer.

21. The method of claim 20, wherein the impact level is indicated by a detected gravitational force (g-force).

22. The method of claim 18, wherein the actuation device comprises an autonomous dart.

23. The method of claim 18, wherein the downhole seat is mounted on a downhole tool in the well tubing, the method further comprising using the actuation device seated in the downhole seat to actuate the downhole tool.

24. The method of claim 23, comprising actuating a plurality of downhole tools in the well tubing in a selected order at selected times using a plurality of actuation devices.

25. The method of claim 18, wherein a plurality of seat structures are mounted in the well tubing, each one of the seat structures comprising a seat to seat the device thereon; wherein the device is configured to experience a physical impact having an impact level exceeding the threshold level when passing through each one of the plurality of seat structures; wherein the controller is configured to determine, based on signals received from the sensor, a number of physical impacts experienced by the device with impact levels exceeding the threshold level, and to activate the surface structure when the number of physical impacts reaches a pre-selected value.

26. A device comprising:
a housing configured to travel within a well tubing, wherein a plurality of seat structures are mounted in the well tubing, each one of the seat structures comprising a seat to seat the device thereon;
a surface structure on an external surface of the housing, having an inactive state and an activated state, and being configured to (i) allow the device to travel through the seat structures when the surface structure is in the inactive state and (ii) to seat in a selected one of the seats in the well tubing when the surface structure is in the activated state, wherein the device is configured to experience a physical impact having an impact level exceeding a threshold level when passing through each one of the plurality of seat structures;
a sensor enclosed in the housing, configured to generate a signal in response to the physical impact experienced by the device; and
a controller housed in the housing and in communication with the sensor to receive the signal from the sensor, wherein the controller is configured to: monitor, based on signals received from the sensor, physical impacts experienced by the device with impact levels exceeding the threshold level, and activate the surface structure when the monitored physical impacts indicate that the device is next reaching a target seat structure, wherein the signal generated by the sensor is indicative of an impact profile or impact characteristics of the detected physical impact experienced by the device, the device experiencing different impact profiles or characteristics when passing through different structures in the well tubing, and the controller is configured to extract and compare the impact profile or impact characteristics from the signal with a stored impact profile or impact characteristics to determine if they match.

27. The device of claim of 26, wherein the each seat structure is configured to generate one or more physical impacts with an identifiable impact profile or identifiable impact characteristic when the device passes through the each seat structure, and the controller is configured to monitor the position of the device in the well tubing based on the impact profiles or impact characteristics of the seat structures passed by the device and determine if the device is next reaching the target seat structure based on the position of the device.

28. The device of claim 27, wherein the impact profile of the each seat structure comprises two or more peaks exceeding the threshold level.

29. The device of claim 27, wherein the controller is configured to identify each seat structure passed by the device based on the identifiable impact profiles or identifiable impact characteristics.

* * * * *